(12) United States Patent
Hendry et al.

(10) Patent No.: US 9,866,869 B2
(45) Date of Patent: Jan. 9, 2018

(54) POC VALUE DESIGN FOR MULTI-LAYER VIDEO CODING

(71) Applicant: QUALCOMM Incorporated, San Diego, CA (US)

(72) Inventors: Fnu Hendry, Poway, CA (US); Adarsh Krishnan Ramasubramonian, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 14/659,213

(22) Filed: Mar. 16, 2015

(65) Prior Publication Data

US 2015/0264366 A1    Sep. 17, 2015

Related U.S. Application Data

(60) Provisional application No. 61/954,551, filed on Mar. 17, 2014, provisional application No. 61/973,104, filed on Mar. 31, 2014.

(51) Int. Cl.
| | |
|---|---|
| *H04N 19/70* | (2014.01) |
| *H04N 19/30* | (2014.01) |
| *H04N 19/46* | (2014.01) |
| *H04N 19/597* | (2014.01) |
| *H04N 19/105* | (2014.01) |
| *H04N 19/68* | (2014.01) |

(52) U.S. Cl.
CPC ........... *H04N 19/70* (2014.11); *H04N 19/105* (2014.11); *H04N 19/30* (2014.11); *H04N 19/46* (2014.11); *H04N 19/597* (2014.11); *H04N 19/68* (2014.11)

(58) Field of Classification Search
None
See application file for complete search history.

(56) References Cited

U.S. PATENT DOCUMENTS

| | | | |
|---|---|---|---|
| 7,586,924 B2 * | 9/2009 | Wiegand | H04L 29/06027 370/395.64 |
| 2013/0089152 A1 * | 4/2013 | Wang | H04N 19/00951 375/240.23 |
| 2014/0064363 A1 * | 3/2014 | Samuelsson | H04N 19/50 375/240.12 |
| 2015/0156501 A1 * | 6/2015 | Hannuksela | H04N 19/70 375/240.12 |
| 2016/0269740 A1 * | 9/2016 | Choi | H04N 19/70 |

OTHER PUBLICATIONS

Response to Second Written Opinion dated Mar. 15, 2016, from International Application No. PCT/US2015/021065, filed on May 13, 2016, 4 pp.

(Continued)

*Primary Examiner* — William C Vaughn, Jr.
*Assistant Examiner* — Lindsay Uhl

(57) ABSTRACT

In an example, a method of coding video data includes coding, by a video coder, at least a portion of a picture of an independently decodable non-base layer of a multi-layer bitstream. The method also includes coding, by the video coder, data indicating a picture order count (POC) value reset for a POC least significant bits (LSB) value of the picture only when the picture has a POC LSB value for the picture is equal to zero.

25 Claims, 7 Drawing Sheets

(56) References Cited

OTHER PUBLICATIONS

International Preliminary Report on Patentability from International Application No. PCT/US2015/021065, dated May 30, 2016, 11 pp.
Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011, (Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (For FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Chen et al., "High Efficiency Video Coding (HEVC) Scalable Extensions Draft 5," JCT-VC Meeting; Jan. 9-17, 2014; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-P1008-v4, XP030115882, Jan. 22, 2014, 125 pp.
Hendry et al., "MV-HEVC/SHVC HLS: On extraction of independent non-base layer," JCT-VC Meeting; Mar. 27-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/,, No. JCTVC-0014241, XP030116076, Apr. 3, 2014, 4 pp.
Hendry et al., "MV-HEVC/SHVC HLS: On extraction of independent non-base layer,"JCT-VC Meeting; Mar. 27-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/,,No. JCTVC-Q0142, XP030116075, Mar. 18, 2014, 4 pp.
Hendry et al., "MV-HEVC/SHVC HLS: On picture order count," JCT-VC Meeting; Jan. 9-17, 2014; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-P0041-v6, XP030115502, Jan. 1, 2014, 12 pp.
Hendry et al., "MV-HEVC/SHVC HLS: On POC," JCT-VC Meeting; Jun. 30-Jul. 9, 2014; Sapporo; (Joint Collaborative Team on Video Coding of ISO/IEC JTC1/SC29/WG11 and ITU-T SG.16); URL: http://wftp3.itu.int/av-arch/jctvc-site/,, No. JCTVC-R0223, XP030116523, Jun. 21, 2014, 7 pp.
International Search Report and Written Opinion—PCT/US2015/021065—ISA/EPO—dated Apr. 30, 2015, 18 pp.
Lee et al., "MV-HEVC/SHVC HLS: On poc reset for long-term reference pictures," JCT-VC Meeting; Oct. 23-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-00128, XP030115134, Oct. 14, 2013, 6 pp.
Ramasubramonian et al., "MV-HEVC/SHVC HLS: Additional information on the POC design in JCTVC-P0041/JCT3V-G0031," JCT-VC Meeting; Jan. 9-17, 2014; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-P0260, XP030115806, Jan. 10, 2014, 5 pp.
Ramasubramonian et al., "MV-HEVC/SHVC HLS: On picture order count and related," JCT-VC Meeting; Mar. 27-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/,, No. JCTVC-Q0146, XP030116080, Mar. 18, 2014, 5 pp.
Ramasubramonian et al., "MV-HEVC/SHVC HLS: On picture order count," Joint Collaborative Team on Video Coding (JCT-VC) of ITU-T SG 16 WP 3 and ISO/IEC JTC 1/SC 29/WG 11. Joint Collaborative Team on 3D Video Coding Extensions of ITU-T SG 16 WP 3 and ISO/IEC JTC 1 /SC 29/WG 11, Oct. 23-Nov. 1, 2013, No. JCTVC-O0213_v3, XP007922965, Jan. 20, 2015, 11 pp.
Sjoberg et al., "Overview of HEVC High-Level Syntax and Reference Picture Management," IEEE Transactions on Circuits and Systems for Video Technology, vol. 22, No. 12, XP011487804, Dec. 2012, pp. 1858-1870.
Tech et al., "MV-HEVC Draft Text 7," Joint Collaborative Team on 3D Video Coding Extension Development of ITU-T SG 16 WP 3 and ISO/IEC JTC 1/SC 29/WG 11, 7th Meeting: San José, US, Jan. 11-17, 2014, JCT3V-G1004-v7, Feb. 28, 2014, 131 pp.
Chen et al., "High efficiency video coding (HEVC) scalable extensions Draft 5," Joint Collaborative Team on Video Coding (JCT-VC) of ITU-T SG 16 WP 3 and ISO/IEC JTC 1/SC 29/WG 11, 16th Meeting: San José, US, Jan. 9-17, 2014, JCTVC-P1008_v4, Jan. 22, 2014, 125 pp.
Chen et al., "Preliminary version of High efficiency video coding (HEVC) scalable extension Draft 7," Joint Collaborative Team on Video Coding (JCT-VC) of ITU-T SG 16 WP 3 and ISO/IEC JTC 1/SC 29/WG 11 18th Meeting: Sapporo, JP, Jun. 30-Jul. 9, 2014, JCTVC-R1008v5, Aug. 13, 2014, 174 pp.
Wang et al. "High Efficiency Video Coding (HEVC) Defect Report 3," Joint Collaborative Team on Video Coding (JCT-VC) of ITU-T

(56) References Cited

OTHER PUBLICATIONS

SG 16 WP 3 and ISO/IEC JTC 1/SC 29/WG 11, 16th Meeting: San José, US, Jan. 9-17, 2014, JCTVC-P1003_v1 relative to L1003_v34, Feb. 8, 2014, 313 pp.

Wang et al. "High Efficiency Video Coding (HEVC) Defect Report 3," Joint Collaborative Team on Video Coding (JCT-VC) of ITU-T SG 16 WP 3 and ISO/IEC JTC 1/SC 29/WG 11, 16th Meeting: San José, US, Jan. 9-17, 2014, JCTVC-P1003_v1 relative to O1003_v2, Feb. 8, 2014, 313 pp.

Hendry et al., "MV-HEVC/SHVC HLS: On extraction of independent non-base layer," Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014, JCTVC-Q0142_r1, Jan. 13, 2015, 5 pp.

ITU-T T.35, Series T: Terminals for Telematic Services, Procedure for the allocation of ITU-T defined codes for non-standards facilities, The International Telecommunication Union, Feb. 2000, 15 pp.

Response to Written Opinion dated Apr. 30, 2015, from International Application No. PCT/US2015/021065, dated Jan. 14, 2016, 3 pp.

Second Written Opinion of International Application No. PCT/US2015/021065, dated Mar. 15, 2016, 10 pp.

\* cited by examiner

POC VALUE DESIGN FOR MULTI-LAYER VIDEO CODING

This application claims the benefit of U.S. Provisional Application No. 61/954,551, filed Mar. 17, 2014, and U.S. Provisional Application No. 61/973,104, filed Mar. 31, 2014, which are hereby incorporated by reference in their entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the ITU-T H.265 High Efficiency Video Coding (HEVC) standard, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames. A picture may refer to a decoded picture or a coded picture.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques for easing extraction of a layer of video data from a multi-layer bitstream. For example, the techniques of this disclosure may be used to control picture order count (POC) value resetting for pictures of an independent non-base layer of a multi-layer bitstream. In some examples, constraining the video coder using the techniques of this disclosure may allow a layer of video data of a multi-layer bitstream to be extracted without changing data in slice headers of the layer. In addition, controlling the locations at which POC value resetting occurs may help to ensure that video coder may appropriately identify long-term reference pictures in a decoded picture buffer (DPB).

In an example, a method of coding video data includes coding, by a video coder, at least a portion of a picture of an independently decodable non-base layer of a multi-layer bitstream, and coding, data indicating a POC value reset for a POC least significant bits (LSB) value of the picture only when the picture has a POC LSB value for the picture is equal to zero.

In another example, a device for coding video data includes a memory configured to store an independently decodable layer of video data of a multi-layer bitstream. The device also includes a video coder configured to code at least a portion of a picture of the independently decodable non-base layer of the multi-layer bitstream, and code data indicating a picture order count (POC) value reset for a POC least significant bits (LSB) value of the picture only when the picture has a POC LSB value for the picture is equal to zero.

In another example, a device for coding video data includes means for coding at least a portion of a picture of an independently decodable non-base layer of a multi-layer bitstream, and means for coding data indicating a picture order count (POC) value reset for a POC least significant bits (LSB) value of the picture only when the picture has a POC LSB value for the picture is equal to zero.

In another example, a non-transitory computer-readable storage medium has stored thereon instructions that, when executed, cause a processor of a device for coding video data to, code at least a portion of a picture of an independently decodable non-base layer of a multi-layer bitstream, and code data indicating a picture order count (POC) value reset for a POC least significant bits (LSB) value of the picture only when the picture has a POC LSB value for the picture is equal to zero.

The details of one or more examples are set forth in the accompanying drawings and the description below. Other features, objects, and advantages will be apparent from the description and drawings, and from the claims.

DETAILED DESCRIPTION

Figure 1:
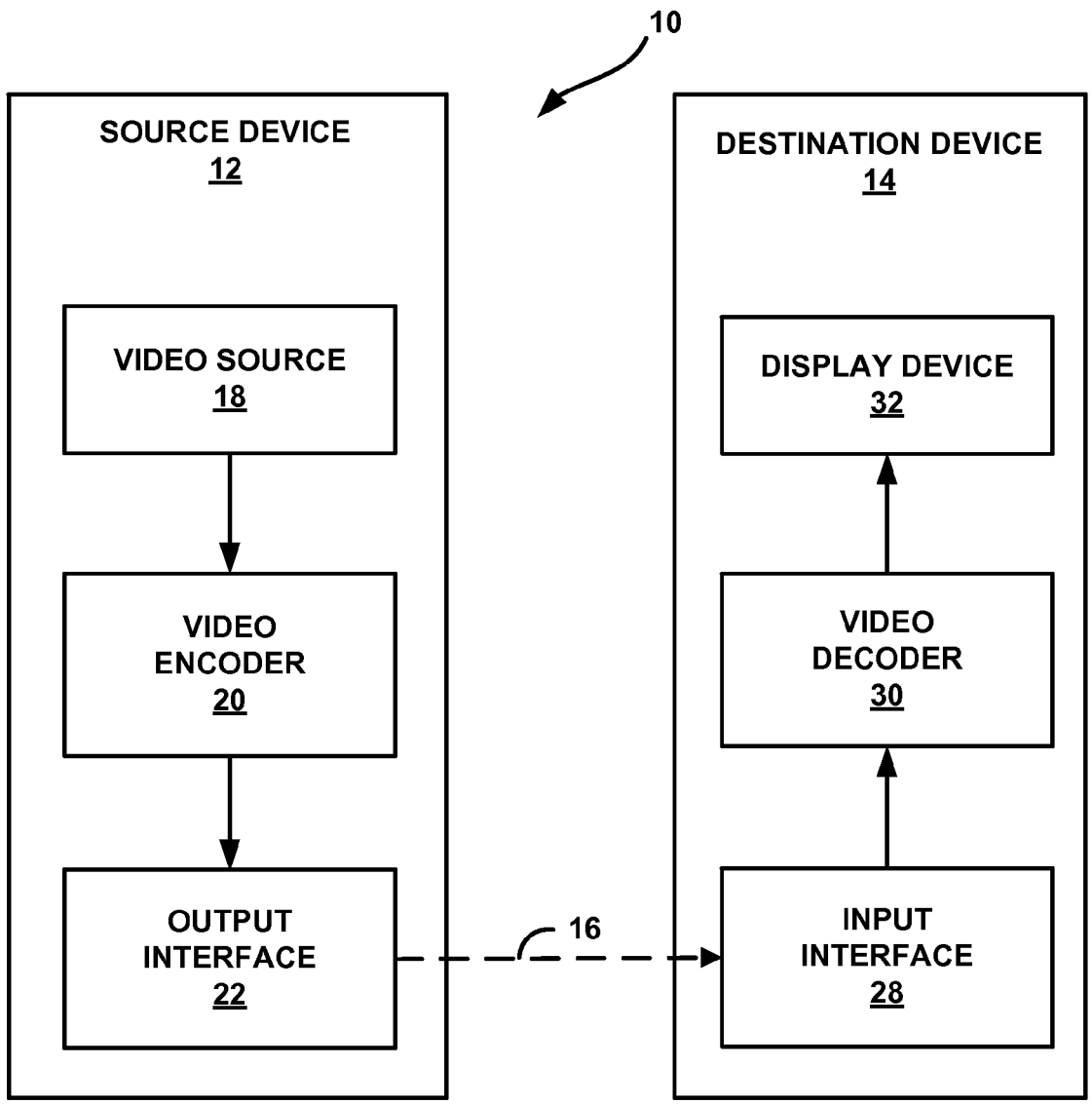
FIG. 1 is a block diagram illustrating an example video encoding and decoding system that may utilize techniques for coding POC value information according to the techniques of this disclosure.

Aspects of this disclosure may relate to various techniques coding an independent non-base layer for multi-layer bit streams. In some instances, the techniques may be performed with multi-layer extensions to a High Efficiency Video Coding (HEVC) standard such as a Multi-view Video Coding extension to HEVC (MV-HEVC) or a Scalable Video Coding (SVC) extension to HEVC (SHVC), as noted below. The techniques of this disclosure, however, are not limited to any particular video coding standard, and may also or alternatively be used with other extensions to HEVC, other multi-view coding standards and/or other multi-layer video standards. In addition, techniques of this disclosure, as described below, may be applied independently or in combination.

A "layer" of video data may generally refer to a sequence of pictures having at least one common characteristic, such as a view, a frame rate, a spatial format or resolution, a signal-to-noise ratio or the like. For example, a layer may include video data associated with a particular view (e.g., perspective) of multi-view video data. As another example, a layer may include video data associated with a particular layer of scalable video data. Thus, this disclosure may interchangeably refer to a layer and a view of video data. That is, a view of video data may be referred to as a layer of video data, and vice versa. In addition, a multi-layer codec (also referred to as a multi-layer video coder or multi-layer encoder-decoder) may refer to a multi-view codec or a scalable codec (e.g., a codec configured to encode and/or decode video data using MV-HEVC, SHVC, or another multi-layer coding technique).

A multi-layer bitstream may include a base layer and one or more non-base layers. The base layer may typically have a layer identifier that is equal to zero. A non-base layer may have a layer identifier that is greater than zero, and may provide additional video data that is not included in the base layer. For example, a non-base layer of multi-view video data may include an additional view of video data. A non-base layer of scalable video data may include an additional layer of scalable video data having an increased or decreased resolution relative to the base layer. A non-base layer may be interchangeably referred to as an enhancement layer.

A layer may be referred to as being "independent" when the layer does not have a direct reference layer. That is, an independent layer may be coded (encoded or decoded) without referring to video data of another layer. An independent non-base layer may conform to a particular coding profile of a particular standard, which does not have to be the same as other layers of a multi-layer bitstream to which the independent layer belongs. In a non-limited example for purposes of illustration, a multi-layer bitstream may conform to MV-HEVC or SHVC. An independent non-base layer of the multi-layer bitstream may be independently coded (e.g., without using inter-layer prediction techniques) and may conform to the HEVC standard. Accordingly, as described in greater detail below, the independent non-base layer may be extracted and decoded using the HEVC standard and without decoding the other layers of the multi-layer bitstream. In some instances, a media aware network element (MANE), splicing unit, or other device may extract independent layers from a multi-layer bitstream. In such instances, the MANE may transmit only the extracted independent layer to a video decoder for decoding. In other instances, another computing device may be responsible for extraction of a sub-bitstream.

The techniques of this disclosure are applicable to the setting of picture order count (POC) values for video coding and may be used to ease extraction of an independent non-base layer from a multi-layer bitstream. For example, a video encoder may encode a multi-layer bitstream according to a particular multi-layer video coding standard, e.g., SHVC or MV-HEVC. A video decoder, media aware network element (MANE), splicing unit, or other device may extract independent non-base layers from such a multi-layer bitstream. As described in greater detail below, the techniques of this disclosure may, in some examples, allow a layer to be extracted from a multi-layer bitstream such as a bitstream conforming to SHVC or MV-HEVC and properly decoded by a video decoder configured to decode using the HEVC standard without altering slice headers or other syntax of the independent non-base layer.

POC values may indicate a display order of pictures and may generally be used to identify the picture. For example, a picture having a POC value of 0 is displayed prior to a picture having a POC value of 1. When a block of a current picture is inter-predicted relative to a reference picture, the reference picture may be identified using a POC value for the reference picture. More particularly, POC values for reference pictures to be included in a reference picture list may be signaled in a parameter set, such as sequence parameter set (SPS), picture parameter set (PPS), and/or a slice header corresponding to the block. In this manner, a video encoder may identify a reference picture by signaling an index into the reference picture list corresponding to the position of the reference picture in the reference picture list, and a video decoder may identify the reference picture by constructing the reference picture list (based on the POC values) and using the reference index to identify the position of a reference picture in the reference picture list.

POC values may be composed of least significance bits (LSBs) and most significant bits (MSBs). In general, the POC LSB value may be signaled in the bitstream. For example, the POC LSB value may be included in a slice header of slices of a picture. A video coder (video encoder or video decoder) may determine a POC MSB value for a picture based on a POC value of a previously coded picture of the bitstream.

POC values may be used in multi-layer video coding to ensure that video data from multiple layers is output appropriately. For example, in multi-layer video coding (e.g., multi-view video coding, scalable video coding, or the like), a view component may comprise an encoded picture for a particular layer or view at a particular time (in terms of display order, or output order). An access unit is, generally, a unit of data including all view components (e.g., all network abstraction layer (NAL) units) for a common temporal instance. The view components of an access unit are typically intended to be output together (i.e., output substantially simultaneously), where outputting a picture generally involves transferring pictures from the DPB (e.g., storing pictures from the DPB to an external memory, sending the pictures from the DPB to a display, removing pictures from the DPB, or the like).

A video coder may periodically reset a POC value. For example, the video coder may typically reset a POC value for an Instantaneous Decoder Refresh (IDR) picture (e.g., a picture that contains only intra-predicted slices). In addition to resetting the POC value, the video coder may decrement a POC value of pictures that have been processed and stored to a DPB previous to the current picture associated with the POC reset. The POC values of reference pictures that have been decremented may have a negative value in order to maintain the appropriate output order of such pictures.

In some instances, a video coder may reset the POC value of a picture in an access unit of a multi-layer bitstream in order to maintain cross-layer alignment with other pictures of the access unit. In a single layer bitstream (e.g. HEVC), each access unit includes a set of NAL units that are associated with each other according to a specified classification rule and that are consecutive in decoding order, and each access unit contains exactly one picture (also referred to as a coded picture). In a multi-layer bitstream (e.g., an SHVC or MV-HEVC bitstream with more than one layer), access units (also known as multi-layer access units) may include one or more coded pictures. If one or more coded pictures are included in a multi-layer access unit, each coded picture is disposed within a sub-bitstream. By way of example, a multi-layer access unit may have one coded picture in a base layer and one coded picture in an enhancement layer. Hence, a multi-layer access unit comprises all coded pictures across layers with the same output time, including all associated video coding layer (VCL) and non-VCL NAL units. The coded pictures in an access unit may be associated with the same value of POC for identification and to ensure that the pictures of the access unit are output at the same or substantially the same time.

With respect to POC value resetting to maintain cross-layer alignment, in an example for purposes of illustration, an access unit may include a base layer IDR picture that causes POC value resetting to be performed and a non-base layer picture that is not an IDR picture. In order to ensure that the POC value of the non-base layer picture of the access unit matches that of the base layer picture, the video coder may reset the POC value of the non-base layer picture.

As noted above, an independent non-base layer may conform to a particular coding profile associated with a particular standard to allow the non-base layer to be extracted from a multi-layer bitstream. Providing for the non-base layer of a multi-layer bitstream to be independently coded, however, may present several challenges. For example, as described in greater detail with respect to FIG. 4 below, resetting a POC LSB value of a picture of an independent non-base layer may cause an issue with appropriately identifying long-term reference pictures (LTRPs) of a reference picture set (RPS). As another example, resetting a POC LSB value of a picture of the independent non-base layer may cause an access unit to contain pictures that are not cross layer aligned.

The techniques of this disclosure may, in some instances, address the challenges noted above. For example, the techniques of this disclosure may be used to allow a non-base layer of a multi-layer bitstream to be extracted and decoded with minimal changes to the non-base layer (e.g., without altering slice headers or other syntax of the non-base layer). The techniques of this disclosure may be used to determine a location of intra random access point (IRAP) pictures in an independent non-base layer. In this manner, the techniques of this disclosure may be used to control POC value resetting for pictures of an independent non-base layer.

According to aspects of this disclosure, a video coder (a video encoder or video decoder) may code a picture of an independently decodable layer of a multi-layer bitstream. The video coder may also code data indicating a POC value reset for a POC LSB value of the picture only when the POC LSB value for the picture is equal to zero. In some examples, the video coder may only code data indicating a POC value reset for an enhancement layer when the picture in the independent non-base layer being coded is an IDR picture or when the picture being coded has a POC LSB value equal to zero prior to performing the POC value reset. As described in greater detail below, controlling the locations at which POC value resetting occurs may help to ensure that video coder may appropriately identify long-term reference pictures in a DPB and maintain bitstream compliance with a particular video coding standard, e.g., such as a standard identified herein.

In a non-limiting example for purposes of illustration, the techniques of this disclosure may allow an independent non-base layer to be extracted from a multi-layer scalable bitstream. For example, an SHVC bitstream may include a base layer having a resolution of 540p and an enhancement layer of 1080p. By convention, in the base layer, an IDR picture may be included up to every 32 pictures. In the enhancement layer, an IDR may be included at a different interval, e.g., every 96 pictures.

The techniques of this disclosure may be used to constrain the manner in which such a scalable bitstream is formed, such that the enhancement layer maintains conformance with the base HEVC standard. For example, as described herein, the techniques of this disclosure may be used to control the manner in which POC value resetting is performed for the SHVC bitstream, such that the enhancement layer may be extracted from the SHVC bitstream and decoded by a decoder conforming to the base HEVC standard. Accordingly, a mobile computing device that has the capability to decode an HEVC bitstream (but not an HEVC bitstream) may receive and decode the enhancement layer without altering the slice headers (which contain POC value information, as described herein) of the enhancement layer.

FIG. 1 is a block diagram illustrating an example video encoding and decoding system 10 that may utilize techniques for managing POC values according to the techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16.

Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, computer-readable medium 16 may include a storage device. For example, the storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store encoded video generated by source device 12 and that may be accessed by destination device. Example file servers include a web server (e.g., for a website), an FTP server, network attached storage (NAS) devices, or a local disk drive.

In the example of FIG. 1, source device 12 includes video source 18, video encoder 20, and output interface 22. Destination device 14 includes input interface 28, video decoder 30, and display device 32. In other examples, a source device and a destination device may include other components or arrangements. For example, source device 12 may receive video data from an external video source, such as an external camera. Likewise, destination device 14 may interface with an external display device, rather than including an integrated display device. Hence, the illustrated system 10 of FIG. 1 is merely one example. Techniques for managing POC values according to the techniques of this disclosure may be performed by any digital video encoding and/or decoding device.

Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14. e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

As noted above, computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 may receive or access information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof. The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined CODEC in a respective device. A device including video encoder 20 and/or video decoder 30 may comprise an integrated circuit, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Video encoder 20 and video decoder 30 may operate according to a video coding standard. Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/TEC Motion Picture Experts Group (MPEG). The multiview extension to HEVC, namely MV-HEVC, is also being developed by the JCT-3V. A recent Working Draft (WD) of MV-HEVC, referred to as MV-HEVC WD7. The scalable extension to HEVC, named SHVC, is also being developed by the JCT-VC. A recent Working Draft (WD) of SHVC and referred to as SHVC WD5. The techniques of this disclosure, however, are not limited to any particular coding standard.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs).

A slice may include an integer number of CTUs ordered consecutively in the raster scan. A slice may comprise a slice header and slice data. The slice header of a slice may be a syntax structure that includes syntax elements that provide information about the slice. The slice data may include coded CTUs of the slice.

This disclosure may use the term "video unit" or "video block" or "block" to refer to one or more sample blocks and syntax structures used to code samples of the one or more blocks of samples. Example types of video units or blocks may include CTUs, CUs, PUs, transform units (TUs), macroblocks, macroblock partitions, and so on. In some contexts, discussion of PUs may be interchanged with discussion of macroblocks of macroblock partitions.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma. Cb and Cr prediction blocks of each PU of the CU.

Video encoder 20 may use intra-prediction or inter-prediction to generate the predictive blocks for a PU. If video encoder 20 uses intra-prediction to generate the predictive blocks of a PU, video encoder 20 may generate the predictive blocks of the PU based on decoded samples of the picture associated with the PU.

If video encoder 20 uses inter-prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two motion vectors (MVs).

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a single layer or a multi-layer bitstream. Each layer has an associated bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for supplemental enhancement information (SEI), and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20.

For instance, video decoder 30 may use motion vectors (MVs) of PUs to determine predictive sample blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture.

Video encoder 20 and video decoder 30 may assign each picture of a video sequence a POC value for identification of the picture. Video encoder 20 may encode (and video decoder 30 may decode) data representative of reference pictures to be included in the reference picture list, e.g., by signaling data representative of POC values for the reference pictures in a slice header and/or in a parameter set, such as a PPS or an SPS. A POC value, represented by the syntax element PicOrderCntVal, for a particular coded picture denotes the picture's relative order in the picture output process with respect to other pictures in the same coded video sequence. The POC values of reference pictures that have been decremented may have a negative value in order to maintain the appropriate output order of such pictures.

A POC value includes a POC LSB value and a POC MSB value. The POC LSB value may increase for each picture and specify an output order from an initial value of zero to a maximum value (e.g., a maximum value specified using 4 to 16 bits). In the example of an eight bit POC LSB value, for purposes of illustration, after a POC LSB value of 255, the POC LSB value may roll over from 255 to zero and the POC LSB value may continue increasing from zero. The POC LSB value may be signaled in the slice header, while the POC MSB value may be computed by video decoder 30 based on the NAL unit type of the current picture and the MSB and LSB of the previous picture in decoding order, referred to as POC-anchor pictures. For SHVC and/or MV-HEVC, additional information may be signaled to assist in computation of a POC MSB. In such examples, when the additional information present, the computation of POC MSB does not depend on the previous picture in decoding order.

An access unit a multi-layer bitstream may include an IRAP picture as well as one or more other pictures that are not IRAP pictures (i.e. non-IRAP pictures). An IRAP picture contains only intra-coded (I) slices, and may be a broken link access (BLA) picture, a clean random access (CRA) picture or an IDR picture. For each layer, the first picture in the bitstream for a coded video sequence is an IRAP picture. IRAP pictures are also provided at various points in each layer of a multi-layer bitstream. A multi-layer access unit may include IRAP pictures and non-IRAP pictures, because the IRAP pictures may not be spaced at the same intervals within each layer. Because IRAP pictures typically require a larger bit payload than inter-coded non-IRAP pictures, video encoder 20 may space IRAP pictures at a greater interval in an enhancement layer as compared to a base layer.

For example, for a GOP of eight, video encoder 20 may space IRAP pictures every 32 pictures in a base layer and space IRAP pictures every 96 pictures in an enhancement layer. At a point in the multi-layer bitstream when one layer (such as a base layer) has an IRAP picture and another layer does not have an IRAP picture, a multi-layer access unit may be referred to as a non-aligned access unit. Subsequent multi-layer access units continue to be non-aligned until a POC is reset. As set forth in greater detail below, provision of an IRAP picture across all layers of a multi-layer access unit may reset the alignment.

In some instances, POC values may be reset for pictures of a multi-layer access unit in order to maintain POC alignment of the pictures in the multi-layer access unit. By way of example, a standards compliant HEVC decoder may be configured to extract and decode a non-base layer (also known as an enhancement layer) of a multi-layer bitstream without updating reference picture set (RPS) information in slice headers of pictures in the extracted layer. The enhancement layer may be, for example, an alternate view in a MV-HEVC bitstream or scaled video in an SHVC bitstream. A layer-specific POC resetting period may be specified based on a POC resetting period identifier signaled in slice segment headers. That is, video encoder 20 and video decoder 30 may respectively code data representative of the POC resetting period identifier in slice segment headers.

Each non-IRAP picture (including pictures of an IDR picture type) that belongs to an access unit that contains at least one IRAP picture may be the start of a POC resetting period may be started in the layer containing the non-IRAP picture. That is, video encoder 20 may set a POC resetting type for a non-IRAP picture of an access unit containing at least one IRAP picture to indicate that the non-IRAP picture is the start of a new POC resetting period. In such an access unit, each picture would then be the start of a POC resetting period in each of the layers.

Video encoder 20 may signal a POC LSB value in a slice segment header that video decoder 30 may use to derive POC values of pictures in a layer including the slice having the slice segment header. The POC LSB value signaled in the slice segment header may be used for derivation of a delta POC value, which may be used for updating the POC values of the same-layer pictures in the DPB, and also for derivation of the POC MSB of the POC value of the current picture.

When performing POC resetting for a POC resetting period, video encoder 20 may signal the POC resetting type in the slice segment header. The POC resetting type may be indicated using a POC value reset index (poc_reset_idc), which may indicate whether the POC values are to be fully or partially reset. For example, in MV-HEVC or SHVC, the POC resetting type may be indicated using a poc_reset_idc syntax element. In such an example, a poc_reset_idc syntax that is equal to 0 specifies that neither the MSBs nor the LSBs of the POC value for the current picture are reset. A poc_reset_idc syntax element that is equal to 1 specifies that only the MSBs of the POC value for the current picture may be reset. A poc_reset_idc syntax element that is equal to 2 specifies that both the MSBs and the LSBs of the POC value for the current picture may be reset. A poc_reset_idc syntax element that is equal to 3 specifies that either only the MSBs or both the MSBs and the LSBs of the POC value for the current picture may be reset and additional POC information is signaled.

For an independent non-base layer to be independently decodable, video encoder 20 and video decoder 30 may apply certain constraints when forming and decoding the bitstream. In a non-limiting example for purposes of illustration, video encoder 20 and video decoder 30 may code a multi-layer bitstream using MV-HEVC or SHVC. Video encoder 20 and video decoder 30 may apply one or more constraints when coding an independent non-base layer to allow the non-base layer to be extracted and decoded using an HEVC compliant decoder. For example, in order for the independent non-base layer to be successfully decoded by the HEVC compliant decoder, video encoder 20 and video decoder 30 may use syntax for the independent non-base layer that conforms to the HEVC. For example, video encoder 20 and video decoder 30 may code slice headers and other syntax of the independent non-base layer to conform to the HEVC standard. In this way, an HEVC compliant video decoder may decode the independent non-base layer without modifying data of slice headers or performing other transcoding operations.

In some instances, resetting a POC LSB value of a picture of the independent non-base layer may cause an issue when attempting to identify a long-term reference picture (LTRP) in an RPS. For example, as noted above, video encoder 20 may encode (and video decoder 30 may decode) data representative of reference pictures to be included in the reference picture list, e.g., by signaling data representative of POC values for the reference pictures in a slice header and/or in a parameter set, such as a PPS or an SPS. In addition, prior to including the data representative of reference pictures to be included in the reference picture list, video encoder 20 and video decoder 30 may decrement the POC values of pictures that have been processed and stored to a DPB previous to the current picture associated with the POC reset.

LTRPs may be identified based on a POC LSB value of the respective LTRPs. As noted above, video encoder 20 may typically adjust (e.g., decrement) the POC LSB values of LTRPs upon performing POC value resetting to account for the POC value reset. Accordingly, video encoder 20 may typically include the decremented POC LSB values of the LTRPs in the slice headers (and/or in a PPS or SPS). For LTRPs that are negative in value (e.g., after a POC value reset), video encoder 20 or video decoder 30 may convert the negative POC LSB value to a positive POC LSB value using a conversion algorithm.

Some video decoders, however, may not be configured to decode syntax associated with POC value resetting. In a non-limiting example for purposes of illustration, an HEVC compliant video decoder may receive an independent non-base layer that has been extracted from a multi-layer bitstream. The HEVC compliant video decoder may not properly interpret POC value resetting syntax. In such instances, the HEVC compliant video decoder may not perform POC value resetting. For example, the HEVC compliant video decoder may discard the POC value resetting information and may not decrement the POC values of pictures stored to the DPB of the HEVC compliant video decoder.

In the example described above, the HEVC compliant video decoder may not properly identify LTRPs based on the POC LSB values of the LTRPs signaled in the slice header, because the HEVC compliant video decoder may not be configured to perform POC value resetting or to decrement POC values of pictures stored to the DPB. That is, the HEVC compliant video decoder may receive POC values of LTRPs that have been decremented by video encoder 20 in the slice headers of pictures (due to the POC value reset).

The POC values of the LTRPs signaled in the slice header, however, may not properly align with the reference pictures in the DPB, because the HEVC compliant video decoder has not decremented the POC values of the pictures of the DPB. Accordingly, the HEVC compliant video decoder may not correctly identify the LTRPs in the DPB base on the received POC values.

In an example for purposes of illustration, video encoder 20 may encode a picture of an independent non-base layer of a multi-layer bitstream using LTRPs having POC LSB values of 10 and 20. Video encoder 20 may perform POC value resetting a picture having a POC LSB value of 60. Accordingly, video encoder 20 may decrement the POC values of the pictures stored to the DPB by 60 and signal the LTRPs using the decremented POC LSB values (e.g., −50 and −40).

In instances in which a video decoder is configured to decode the bitstream without performing POC value resetting (such as the HEVC complaint video decoder noted above), however, the video decoder may not decrement the POC LSB values of pictures stored to the DPB. For example, upon extracting the independent non-base layer from the multi-layer bitstream, the video decoder may decode indications of LTRP POC LSB values of −50 and −40 from a slice header. The corresponding pictures stored to the DPB, however, may still have the values of 10 and 20 because video decoder 30 has not performed POC value resetting. Accordingly, the video decoder may not properly identify the LTRPs in the DPB based on the signaled POC LSB values.

According to aspects of this disclosure, video encoder 20 and video decoder 30 may control the manner in which POC value resetting is performed. The techniques may, in some instances, allow the POC values of LTRPs signaled in a slice header to maintain consistency with POC values of reference pictures stored to a DPB of video decoder when decoding an independent non-base layer.

In an example, video encoder 20 and video decoder 30 may code (encode or decode) a picture of an independently decodable layer of a multi-layer bitstream. Video encoder 20 and video decoder 30 may also code data indicating a POC value reset for a POC LSB value of the picture only when the picture has a POC LSB value for the picture is equal to zero. In such instances, performing the POC value reset does not require video encoder 20 or video decoder 30 to decrement POC values of pictures stored to a DPB, because the POC LSB value is already equal to zero.

Returning to the example described above for purposes of illustration, if video encoder 20 and video decoder 30 perform POC value resetting at a picture having a POC LSB value of zero (e.g., rather than the POC LSB value of 60 noted above), video encoder 20 and video decoder 30 do not decrement the POC LSB values of pictures stored to the DPB, because the difference between the POC LSB value and zero is zero. Accordingly, the POC LSB values of LTRPs signaled in a slice header are consistent with POC LSB values of pictures stored to a DPB at video decoder 30.

In some examples, according to aspects of this disclosure, video encoder 20 and video decoder 30 may apply constraints so that POC value resetting is only performed for pictures having a POC LSB value that is equal to zero. In an example, for an independent non-base layer (layerA) to be able to be extracted and maintain conformance with a particular standard (e.g., maintain conformance with a profile of HEVC) without changing the slice header of a VCL NAL unit of the pictures in layerA, video encoder 20 and video decoder 30 may apply the following constraints: (1) for every slice segment header of the IDR pictures in layerA, a slice_pic_order_cnt_lsb syntax element shall not be present; and (2) each picture in the layer shall not have a long-term reference picture that precedes a POC resetting picture that resets both MSB and LSB values of the POC value.

In another example, video encoder 20 and video decoder 30 may apply the following constraints: (1) for every slice segment header of an IDR picture in layerA, the slice_pic_order_cnt_lsb syntax element shall not present; and (2) there shall be no POC resetting picture that resets both MSB and LSB values of a POC value in layerA, unless such a POC resetting picture has POC LSB equal to 0 (before the reset).

In another example, video encoder 20 and video decoder 30 may apply the following constraints: (1) for every slice segment headers of an IDR picture in layerA, the slice_pic_order_nt_lsb syntax element shall not present; (2) there shall be no POC resetting picture that resets both MSB and LSB values of a POC value in layerA unless such a POC resetting picture is also an IDR picture, and (3) there shall be no POC resetting picture with a poc_reset_idc syntax element that is equal to 3 that indicates resetting MSB and LSB values of a POC value in layerA unless the resetting pictures is also an IDR picture.

In still another example, video encoder 20 and video decoder 30 may condition the presence of a base_layer_parameter_set_compatibility_flag[i] on a value of poc_lsb_not_present_flag[i], as described in greater detail below. In still another example, video encoder 20 may signal (and video decoder 30 may decode) a flag for each independent non-base layer to indicate whether the layer maintains compatibility with a particular standard (e.g., HEVC) after extraction.

The techniques of this disclosure also relate to maintaining POC value alignment of pictures of a multi-layer access unit (e.g., maintaining that all pictures of the access unit have the same POC value). For example, while POC value resetting is typically performed for IDR pictures, in some instances in multi-layer coding, video encoder 20 and video decoder 30 may not reset the POC value of an IDR picture. In an example for purposes of illustration, an access unit may include a base layer picture that is not an IDR picture a non-base layer picture that is an IDR picture. While video encoder 20 and video decoder 30 may typically perform POC value resetting for the IDR picture of the non-base layer, in order to maintain POC value alignment in the access unit, video encoder 20 may instead signal (and video decoder 30 may decode) the POC LSB value of the base layer for the non-base layer picture. For example, video encoder 20 may include an indication of the POC LSB value of the base layer (which is not equal to zero) in slice headers of the non-base layer picture.

The example described above, however, may present a challenge when coding an independent non-base layer. In a non-limiting example for purposes of illustration, an HEVC compliant video decoder may reset a POC LSB value of an IDR picture to be equal to zero. In such an example, the HEVC compliant video decoder may not be configured to decode an indication of the POC LSB value from the slice headers of slices of the IDR picture, because the POC LSB value is zero. Hence, the HEVC compliant video decoder may malfunction when a POC LSB value is signaled in slice headers of an IDR picture, because the HEVC compliant video decoder may not be configured to decode the POC LSB value from the slice headers of IDR pictures. The decoder may then skip ahead to the next IRAP picture in sequence, which may degrade continuity in a user experience.

The above-noted MV-HEVC and SHVC standards may indicate whether a sub-bitstream is independently decodable using one or more syntax elements, including a poc_lsb_not_present_flag. In some instances, a poc_lsb_not_present_flag that is equal to 1 may indicate that the layer associated with the poc_lsb_not_present_flag is independently decodable, e.g., by an HEVC compliant video decoder. Conversely, a poc_lsb_not_present_flag that is equal to 0 may indicate that certain syntax such as syntax included in slice headers may need to be modified for the layer to be independently decoded.

In general, the poc_lsb_not_present_flag may indicate whether a POC LSB value is included in a slice header of an IDR picture. According to SHVC and MV-HEVC, the poc_lsb_not_present_flag equal to one specifies that the POC LSB value is not present in the slice headers of IDR pictures. The poc_lsb_not_present_flag equal to zero specifies that the POC LSB value may or may not be present in the slice headers of IDR pictures. The poc_lsb_not_present_flag may allow for relatively easier extraction and decoding of a non-base layer, because it provides an indication that a POC LSB value may be included in a slice header.

With respect to the above-noted MV-HEVC and SHVC standards, the only explicit constraint on setting the poc_lsb_not_present_flag equal to one (e.g., indicating that the POC LSB value is not included in the slice header) is that the layer being coded is an independent layer. Indicating that the POC LSB value is not included in the slice header, however, may create an issue for pictures of an independent layer that do not have a POC LSB value of zero, as described in greater detail with respect to the example of FIG. 5 below.

According to aspects of this disclosure, video encoder 20 and video decoder 30 may code data indicating a POC value reset for a POC LSB value of a picture only when the picture has a POC LSB value for the picture is equal to zero. For example, video encoder 20 and video decoder 30 apply a constraint such that the value of poc_lsb_not_present_flag [i] shall not be equal to one (e.g., indicating that the POC LSB value is not included in the slice header) unless the POC LSB value of an IDR picture in the layer may be inferred to be equal to zero. The POC LSB value of an independent non-base layer picture may be inferred to be equal to zero when the POC LSB value of a base layer picture in the same access unit is an IDR picture, or when the POC LSB value of the non-base layer picture is zero valued (e.g., following a normal progression of POC LSB values from 0 to a maximum POC LSB value).

Figure 2:
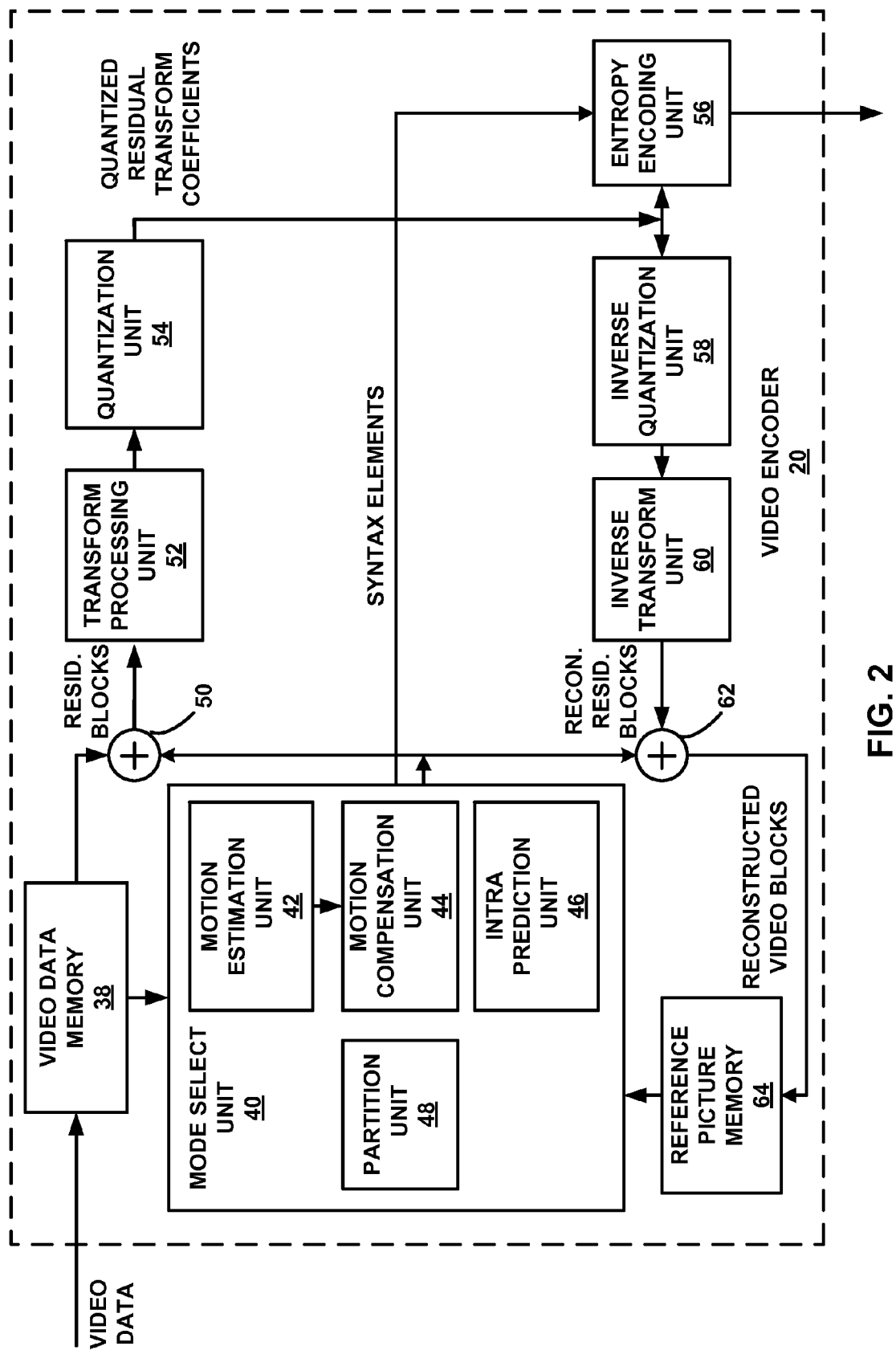
FIG. 2 is a block diagram illustrating an example of a video encoder that may implement techniques for coding POC value information according to the techniques of this disclosure.

FIG. 2 is a block diagram illustrating an example of video encoder 20 that may implement techniques for managing POC values according to the techniques of this disclosure. In particular, video encoder 20 may be configured to manage POC values of pictures of a multi-layer bitstream according to techniques of this disclosure. As noted above, video encoder 20 may be adapted to perform multiview and/or scalable video coding. For example, video encoder 20 may be configured to encode a bitstream that conforms to one or more video coding standard extensions, such as SHVC or MV-HEVC. However, while reference is made to specific coding standards, it should be understood that the techniques are not specific to any one coding standard, and may be implemented with future and/or not yet developed standards.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes video data memory 38, mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Video data memory 38 may store the video data to be encoded by the components of video encoder 20. The video data stored in video data memory 38 may be obtained, for example, from video source 18. Reference picture memory 64 may be referred to as a DPB that stores reference video data for use in encoding video data by video encoder 20, e.g., in intra- or inter-coding modes. Video data memory 38 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 38 and reference picture memory 64 may be provided by the same memory device or separate memory devices. In various examples, video data memory 38 may be on-chip with other components of video encoder 20, or off-chip relative to those components.

Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture (or other coded unit) relative to the current block being encoded within the current slice (or other coded unit). A predictive block is a block that is found to closely match the block to be encoded, in terms of pixel difference, which may be determined by sum of absolute difference (SAD), sum of square difference (SSD), or other difference metrics.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being encoded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Motion estimation unit 42 searches reference pictures stored in a DPB of reference picture memory 64. Mode select unit 40 may determine which reference pictures are to be used to encode a picture, slice of picture, and/or a sequence of pictures. Video encoder 20 may encode picture order count (POC) values for reference pictures used to encode the picture, slice, or sequence. Video encoder 20 may encode the POC values indicative of the reference pictures to be included in the reference picture list in slice headers and/or parameter sets, such as PPSs and/or SPSs.

In this manner, a video decoder, such as video decoder 30, may reproduce the reference picture list by including the reference pictures indicated in the slice header and/or parameter set(s). Furthermore, after encoding a block using a motion vector produced by motion estimation unit 42, video encoder 20 may encode motion information for the block, where the motion information may include data representative of the motion vector, an identifier for the reference picture list, and a reference index that identifies a reference picture in the reference picture list.

In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Video encoder 20 may also form POC resetting periods and encode values for POC resetting period identifiers for slices of pictures to assign the slices to respective POC resetting periods. Video encoder 20 may assign slices to POC resetting periods individually within each layer of video data. Moreover, video encoder 20 may determine POC resetting types for the slices and encode values for indications of the POC resetting types (e.g., two-bit values) for the slices.

As discussed with respect to FIG. 1, video encoder 20 may be configured according to restrictions established by an applicable video coding standard. For example, video encoder 20 may ensure that the first picture in each POC resetting period has a POC resetting type (e.g., a poc_reset_idc) indicating that POC values are to be fully or partially reset. In general, as described above, video encoder 20 may determine a POC MSB value for a current picture based on the POC MSB value of the picture coded prior to the current picture in cording order, or based on additional information (e.g., POC MSB cycle) that is signaled in the slice header.

According to aspects of this disclosure, video encoder 20 may encode data indicating a POC value reset for a POC LSB value of a picture of an independent non-base layer only when the picture has a POC LSB value for the picture that is equal to zero. For example, video encoder 20 may encode a poc_reset_idc syntax element. Video encoder 20 may set a poc_reset_idc syntax element equal to 0 to specify that neither the MSBs nor the LSBs of a POC value for the current picture are reset. Video encoder 20 may set a poc_reset_idc syntax element equal to 1 to specify that only the MSBs of the POC value for the current picture may be reset. Video encoder 20 may set a poc_reset_idc syntax element equal to 2 to specify that both the MSBs and the LSBs of the POC value for the current picture may be reset. Video encoder 20 may set a poc_reset_idc syntax element equal to 3 to specify that either only the MSBs or both the MSBs and the LSBs of the POC value for the current picture may be reset and that additional picture order count information may be signaled.

Video encoder 20 may control the manner in which the poc_reset_idc value is set based on one or more constraints. For example, video encoder 20 may control the manner in which the poc_reset_idc syntax element is set to ensure that the resulting bitstream conforms to a particular standard. According to aspects of this disclosure, video encoder 20 may set the poc_reset_idc syntax element for a picture in an independent non-base layer of a multi-layer bitstream in a way that allows the independent non-base layer to be independently decoded, e.g., without changing/updating information contained in slice headers of coded slices of the independent non-base layer.

For example, according to aspects of this disclosure, video encoder 20 may encode the poc_reset_idc syntax element to be equal to 2 only when the picture being coded has a POC LSB value equal to zero. That is, when a poc_lsb_not_present_flag for a particular layer being coded is equal to 1 (e.g., indicating that the layer is an independent non-base layer) and a slice_pic_order_cnt_lsb syntax element indicating the POC LSB value of the picture is greater than zero, video encoder 20 may not set the value of poc_reset_idc to be equal to 2.

When video encoder 20 encodes poc_reset_idc syntax element to be equal to 3, video encoder 20 may further encode a full_poc_reset_flag and a poc_sb_val syntax element. In MV-HEVC and SHVC, a full_poc_reset_flag equal to 1 specifies that both the MSBs and the LSBs of the POC value for the current picture are reset when the previous picture in decoding order in the same layer does not belong to the same POC resetting period. A full_poc_reset_flag equal to 0 specifies that only the MSBs of the POC value for the current picture are reset when the previous picture in decoding order in the same layer does not belong to the same POC resetting period. In addition, the poc_lsb_val syntax element specifies a value that may be used to derive the picture order count of the current picture.

According to aspects of this disclosure, video encoder 20 may control the manner in which the poc_lsb_val is encoded based on whether the layer being encoded is an independent non-base layer. For example, when poc_lsb_not_present_flag for the layer being encoded is equal to 1 and full_poc_reset_flag is equal to 1, video encoder 20 may set the value of poc_lsb_val equal to zero. In this manner, video encoder 20 may ensure POC value resetting is only performed for pictures having a POC LSB value equal to zero, which may allow reference pictures to be properly identified in a reference picture set, as described in greater detail below with respect to FIG. 4.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

In this manner, video encoder 20 of FIG. 2 represents an example of a video encoder configured to encode at least a portion of a picture of an independently decodable layer of a multi-layer bitstream, and encode data indicating a POC value reset for a POC LSB value of the picture only when the picture has a POC LSB value for the picture is equal to zero.

Figure 3:
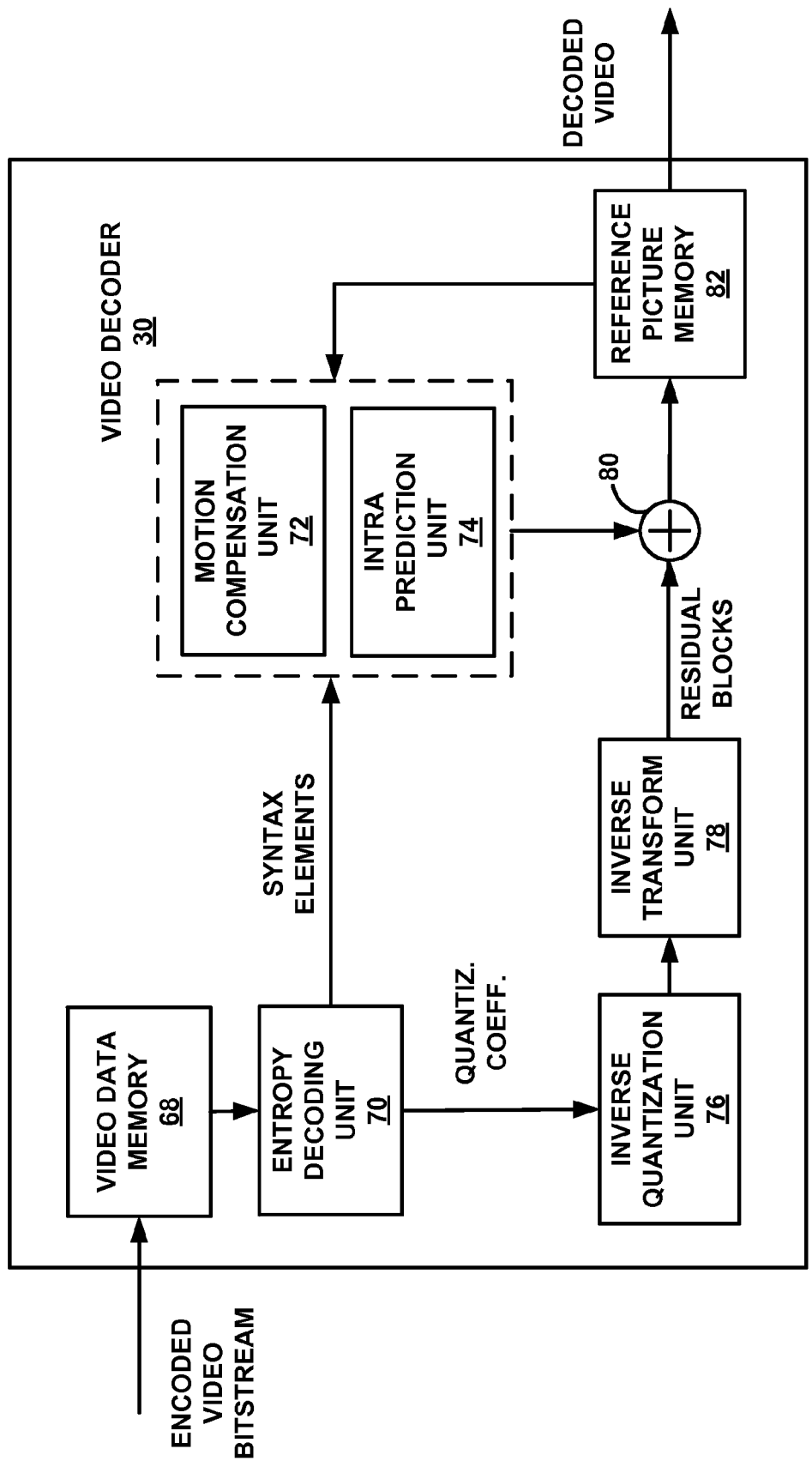
FIG. 3 is a block diagram illustrating an example of a video decoder that may implement techniques for coding POC value information according to the techniques of this disclosure.

FIG. 3 is a block diagram illustrating an example of video decoder 30 that may implement techniques for managing POC values according to the techniques of this disclosure. As noted above, video decoder 30 may be adapted to perform multiview and/or scalable video coding. For example, video decoder 30 may be configured to decode a bitstream that conforms to one or more video coding standard extensions, such as SHVC or MV-HEVC. However, while reference is made to specific coding standards, it should be understood that the techniques are not specific to any one coding standard, and may be implemented with future and/or not yet developed standards.

In the example of FIG. 3, video decoder 30 includes video data memory 68, an entropy decoding unit 70, motion compensation unit 72, intra-prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

Video data memory 68 may store video data, such as an encoded video bitstream, to be decoded by the components of video decoder 30. The video data stored in video data memory 68 may be obtained, for example, from computer-readable medium, e.g., from a local video source, such as a camera, via wired or wireless network communication of video data, or by accessing physical data storage media. Video data memory 68 may form a coded picture buffer (CPB) that stores encoded video data from an encoded video bitstream. Reference picture memory 82 may be referred to as a DPB that stores reference video data for use in decoding video data by video decoder 30, e.g., in intra- or inter-coding modes. Video data memory 68 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 68 and reference picture memory 82 may be provided by the same memory device or separate memory devices. In various examples, video data memory 68 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 (L0) and List 1 (L1), using default construction techniques based on reference pictures stored in a DPB of reference picture memory 82.

More particularly, video decoder 30 may decode a PPS indicating whether slices of a picture corresponding to the PPS include POC resetting information. Assuming the slices include the POC resetting information, video decoder 30 may decode a slice segment header of a slice of the picture including the POC resetting information. The POC resetting information may include a POC resetting period identifier and a POC resetting type.

The POC resetting period identifier may indicate a POC resetting period to which the slice corresponds. The POC resetting type may indicate whether the POC value of a picture including the slice is fully reset or that only the MSB of the POC value are reset. Furthermore, the POC resetting type may indicate that no POC reset is to be performed or that additional information is signaled. If the POC resetting type indicates that additional information is signaled, video decoder 30 may decode the additional information, which may indicate a POC LSB value and whether the POC value is fully reset or only MSB are reset.

According to aspects of this disclosure, video decoder 30 may be configured to decode an independently decodable non-base layer of a multi-layer bitstream. For example, according to aspects of this disclosure, video decoder 30 may decode data indicating a POC value reset for a POC LSB value of a picture only when the picture has a POC LSB value for the picture that is equal to zero.

In some instances, video decoder 30 may be configured to decode a poc_reset_idc syntax element. According to aspects of this disclosure, video decoder 30 may decode the poc_reset_idc syntax element based on one or more constraints. For example, video decoder 30 may decode a poc_reset_idc syntax element that conforms to a particular standard. For example, according to aspects of this disclosure, video decoder 30 may decode the poc_reset_idc syntax element to be equal to 2 only when the picture being coded has a POC LSB value equal to zero. That is, when a poc_lsb_not_present_flag for a particular layer being coded is equal to 1 (e.g., indicating that the layer is an independent non-base layer) and a slice_pic_order_cnt_lsb syntax element indicating the POC LSB value of the picture is greater than 0, video decoder 30 may not decode a value of poc_reset_ide that is equal to 2.

When video decoder 30 decodes a poc_reset_idc syntax element that is equal to 3, video decoder 30 may further decode a full_poc_reset_flag and a poc_lsb_val syntax element. According to aspects of this disclosure, when poc_lsb_not_present_flag for the layer being decoded is equal to 1 and a full_poc_reset_flag is equal to 1, video decoder 30 may decode a value of poc_lsb_val that is equal to 0. In this manner, video decoder 30 may ensure POC value resetting is only performed for pictures having a POC LSB value equal to zero, which may allow reference pictures to be properly identified in a reference picture set, as described in greater detail below with respect to FIG. 4.

Video decoder 30 may also decode POC values of reference pictures to be included in a reference picture list. Video decoder 30 may decode these POC values in the slice segment headers and/or from parameter sets, such as a PPS or an SPS. Video decoder 30 may then construct a reference picture list including the reference pictures identified by the decoded POC values.

After constructing the reference picture list for a slice, video decoder 30 may decode blocks of the slice. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), motion vectors for each inter-encoded video block of the slice, inter-prediction status for each inter-coded video block of the slice, and other information to decode the video blocks in the current video slice. Motion information for an inter-predicted block may include a reference picture list identifier and a reference index to identify a reference picture in the reference picture list to use to predict the block.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 of FIG. 3 represents an example of a video decoder configured to decode at least a portion of a picture of an independently decodable layer of a multi-layer bitstream, and decode data indicating a POC value reset for a POC LSB value of the picture only when the picture has a POC LSB value for the picture is equal to zero.

Figure 4:
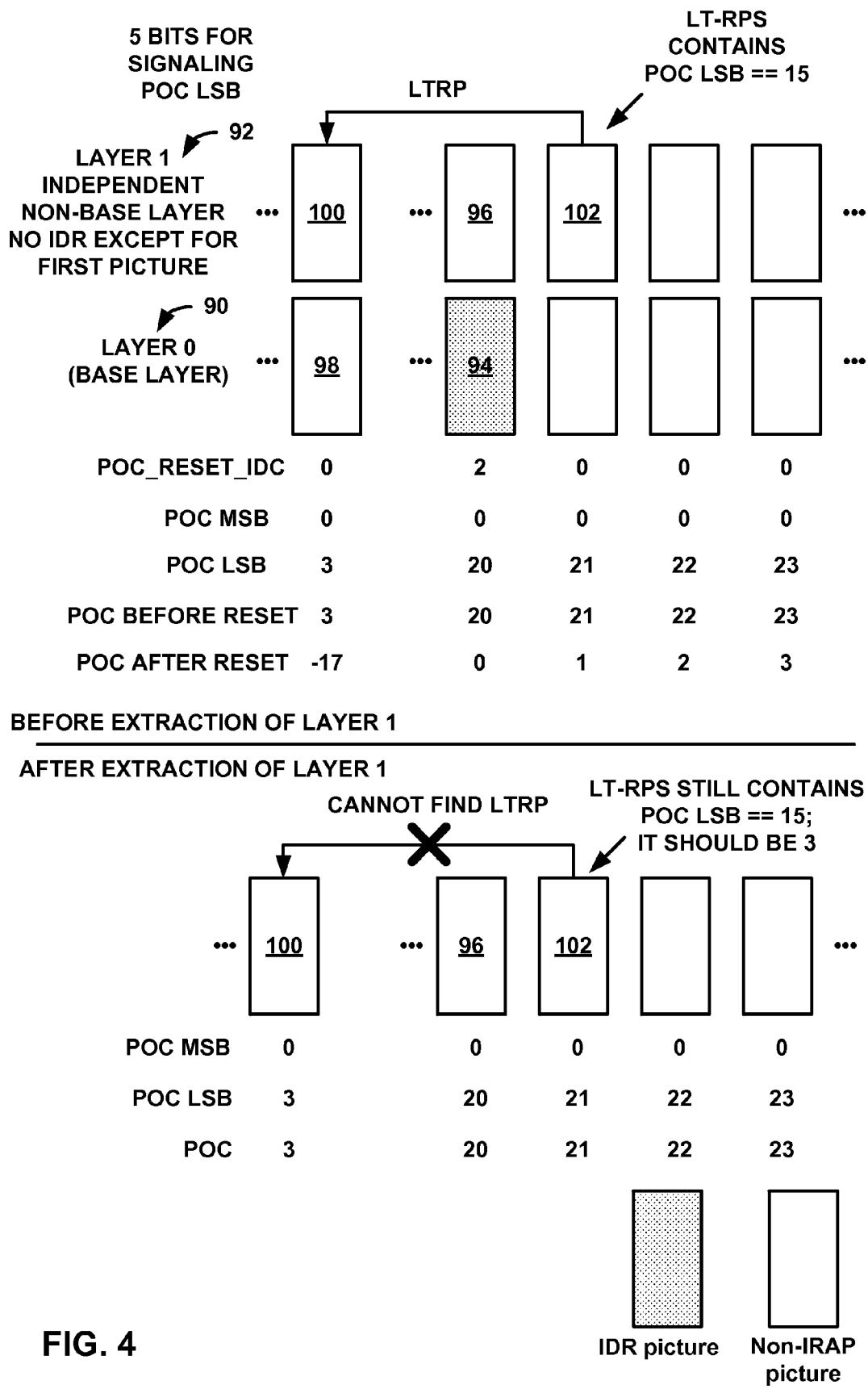
FIG. 4 is a conceptual diagram illustrating POC value resetting for an independent non-base layer of a multi-layer bitstream.

FIG. 4 is a conceptual diagram illustrating POC value resetting for an independent non-base layer of a multi-layer bitstream. In the example of FIG. 4, the multi-layer bitstream includes a base layer (LAYER 0) 90 and independent non-base layer (LAYER 1) 92. In general, the top half of the example diagram set forth in FIG. 4 illustrates the multi-layer bitstream prior to extraction, e.g., as encoded by a video encoder such as video encoder 20 (indicated by the phrase "before extraction of layer 1"). The bottom half of the example diagram set forth in FIG. 4 illustrates a sub-bitstream that contains non-base layer 92 after extraction from the multi-layer bitstream, e.g., for decoding by a video decoder such as video decoder 30 (indicated by the phrase "after extraction of layer 1").

Prior to extraction, video encoder 20 may encode base layer 90 and non-base layer 92 using a particular video coding standard, e.g., MV-HEVC or SHVC. For example, video encoder 20 may be configured to perform POC value resetting for IDR picture 94. Video encoder may signal POC value reset index (poc_reset_idc) that is equal to 2. Prior to POC value resetting, picture 94 has a POC MSB value of 0 and a POC LSB value of 20. After POC value resetting, picture 94 has a POC MSB value of 0 and a POC LSB value of 0. In addition, in order to maintain cross-layer alignment of POC values, video encoder 20 may perform POC value resetting of picture 96 included in non-base layer 92. Accordingly, prior to POC value resetting, picture 96 has a POC MSB value of 0 and a POC LSB value of 20. After POC value resetting, picture 96 has a POC MSB value of 0 and a POC LSB value of 0.

When performing POC value resetting, video encoder 20 may also decrement the POC LSB values of pictures stored to a DPB to account for the POC value resetting. For example, video encoder 20 may decrement the POC LSB value of each reference picture stored to the DPB by 20 (e.g., the difference between the original POC LSB value and the reset POC LSB value). Accordingly, prior to POC value resetting, reference picture 98 has a POC MSB value of 0 and a POC LSB value of 3. After POC value resetting, reference picture 98 has a POC MSB value of 0 and a POC LSB value of −17. Likewise, prior to POC value resetting, reference picture 100 has a POC MSB value of 0 and a POC LSB value of 3. After POC value resetting, reference picture 100 has a POC MSB value of 0 and a POC LSB value of −17.

Video encoder 20 also encodes picture 102 of non-base layer 92 using inter-prediction. For example, video encoder 20 identifies reference picture 100 as a LTRP and includes reference picture 100 in an RPS for encoding picture 102 (e.g., a long-term reference picture set (LT-RPS)). Video encoder 20 may also signal the POC LSB value of reference picture 100 in a slice header of a slice of picture 102 or in a parameter set referred to by picture 102 to identify reference picture 100 as an LTRP. That is, video encoder 20 may signal the POC LSB value of reference picture 100 after performing POC value resetting, such that the POC LSB value signaled is 15 (after conversion of the −17 to a positive number using a conversion algorithm).

After extraction, as noted above, video decoder 30 may be configured to decode non-base layer 92 by conforming to a particular single layer standard, e.g., HEVC, which is not necessarily the same as the multi-layer standard used to encode non-base layer. Accordingly, video decoder 30 may use the syntax associated with the standard to decode non-base layer 92 and discard or otherwise ignore other syntax. While reference is made herein to video decoder 30 conforming to HEVC, and/or multi-layer extensions of HEVC, it should be understood that the techniques of this disclosure are not necessarily limited in this way and may be used with other standards.

To decode picture 102, video decoder 30 may be configured to perform inter-prediction in a manner that is reciprocal to that performed by video encoder 20. Accordingly, video decoder 30 may construct reference picture list that may include one or more pictures from the LT-RPS. For example, video decoder 30 may decode a slice header of a slice of picture 102 or a parameter set referred to by picture 102 to identify one or more long-term reference pictures including reference picture 100.

As noted above, the POC LSB value of reference picture 100 may be signaled in the slice header of picture 102 as being equal to 15 (e.g., corresponding to a POC LSB value of −17 after performing POC value resetting). However, video decoder 30 may not be configured to perform POC value resetting. For example, when decoding picture 96, video decoder 30 may not decode the poc_reset_idc syntax element and may not decrement the POC LSB values of pictures stored to the DPB. Accordingly, the POC LSB value of reference picture 100 is equal to 3. Reference picture 100, however, is identified in the slice header by a POC LSB value of 15. Hence, in the example of FIG. 4, video decoder 30 may locate reference picture 100 in the DPB, because the POC LSB value of reference picture 100 does not match the POC LSB value signaled in the slice header.

As illustrated by the example of FIG. 4, in order to extract an independent enhancement layer (such as non-base layer 92) that is able to be decoded by an HEVC decoder without changing slice header information, video decoder 30 may consider whether LTRPs are used for prediction of pictures in the layer and whether pictures that reset both POC LSB and POC MSB are present in the layer. These two parameters may be considered to determine whether it is possible to extract the independent enhancement layer from a multi-layer bitstream without having to change slice headers of pictures in the layer.

According to aspects of this disclosure, video encoder 20 and video decoder 30 may control the manner in which POC value resetting is performed for independent non-base layers. The techniques may, in some instances, allow the POC values of LTRPs signaled in a slice header to maintain consistency with POC values of reference pictures stored to a DPB of video decoder. In an example, video encoder 20 and video decoder 30 may code (encode or decode) a picture of an independently decodable layer of a multi-layer bitstream. Video encoder 20 and video decoder 30 may also code data indicating a POC value reset for a POC LSB value of the picture only when the picture has a POC LSB value for the picture is equal to zero. In such instances, performing the POC value reset does not require video encoder 20 or video decoder 30 to decrement POC values of pictures stored to a DPB, because the POC LSB value is already equal to zero.

Example syntax and semantics for managing POC value resetting, in accordance with various techniques of this disclosure, are set forth below. The syntax and semantics described are relative to e.g., that of MV-HEVC and SHVC noted above. In the example description, syntax tables and semantics below, additions to MV-HEVC and SHVC are represented using italics and deletions are represented using bracketed text preceded by "removed" (e.g., [removed: "removed text"]). In general, statements regarding "requirements" should be understood to form part of the text of the standard or standard extension, and not a requirement for purposes of the techniques of this disclosure. In some instances, such "requirements" may include bitstream constraints that may be determined to be applicable and then adhered to by, for example, a video coder based on the determination).

In a first example, the following changes may be made to the semantics of the syntax element base_layer_parameter_set_compatibility_flag[i] in video parameter set (VPS) video usability information (VUI):

base_layer_parameter_set_compatibility_flag[i] equal to 1 specifies that the following constraints apply to the layer with nuh_layer_id equal to layer_id_in_nuh[i]. base_layer_parameter_set_compatibility_flag[i] equal to 0 specifies that the following constraints may or may not apply to the layer with nuh_layer_id equal to layer_id_in_nuh[i]. When not present, the value of base_layer_parameter_set_compatibility_flag[i] is inferred to be equal to 0.

Each coded slice segment NAL unit with nuh_layer_id value equal to layer_id_in_nuh[i] referring to the VPS shall refer to a PPS with nuh_layer_id value equal to 0.

Each coded slice segment NAL unit with nuh_layer_id value equal to layer_id_in_nuh[i] referring to the VPS shall refer to a SPS with nuh_layer_id value equal to 0.

The values of chroma_format_idc, separate_colour_plane_flag, pic_width_in_luma_samples, pic_height_in_luma_samples, bit_depth_luma_minus8, and bit_depth_chroma_minus8, respectively, of the active SPS for the layer with nuh_layer_id equal to layer_id_in_nuh[i] shall be the same as the values of chroma_format_idc, separate_colour_plane_flag, pic_width_in_luma_samples, pic_height_in_luma_samples, bit_depth_luma_minus8, and bit_depth_chroma_minus8, respectively, of the vps_rep_format_idx[i]-th rep_format( ) syntax structure in the active VPS.

*The value of poc_lsh_not_present_flag[i] shall be equal to 1.*

*When an access unit that contains a picture picA with nuh_layer_id equal to layer_id_in_nuh_[i] referring to the VPS also contains a picture with nuh_layer_id equal to 0 and slice_pic_order_cnt_lsb greater than 0, the picture picA shall be a non-IDR picture.*

When coded slice segment NAL unit with nuh_layer_id value equal to layer_id_in_nuh[i] referring to the VPS that has non-zero value of either num_long_term_sps or num_long_term_pics, or both, and slice_pic-order_cnt_lsb is not equal to 0, poc_reset_idc shall not be equal to 2.

In a second example, the name of the syntax element base_layer_parameter_set_compatibility_flag[i] to base_layer_compatibility_flag[i]. In addition, the following changes may be made to the semantics of the syntax element base_layer_parameter_set_compatibility_flag[i] in VPS VUI (indicated below as base_layer_compatibility_flag[i]):

base_layer_compatibility_flag[i] equal to 1 specifies that the following constraints apply to the layer with nuh_layer_id equal to layer_id_in_nuh[i]. base_layer_compatibility_flag[i] equal to 0 specifies that the following constraints may or may not apply to the layer with nuh_layer_id equal to layer_id_in_nuh[i]. When not present, the value of base_layer_compatibility_flag[i] is inferred to be equal to 0.

Each coded slice segment NAL unit with nuh_layer_id value equal to layer_id_in_nuh[i] referring to the VPS shall refer to a PPS with nuh_layer_id value equal to 0.

Each coded slice segment NAL unit with nuh_layer_id value equal to layer_id_in_nuh[i] referring to the VPS shall refer to a SPS with nuh_layer_id value equal to 0.

The values of chroma_format_idc, separate_colour_plane_flag, pic_width_in_luma_samples, pic_height_in_luma_samples, bit_depth_luma_minus8, and bit_depth_chroma_minus8, respectively, of the active SPS for the layer with nuh_layer_id equal to layer_id_in_nuh[i] shall be the same as the values of chroma_format_idc, separate_colour_plane_flag, pic_width_in_luma_samples, pic_height_in_luma_samples, bit_depth_luma_minus8, and bit_depth_chroma_minus8, respectively, of the vps_rep_format_idx[i]-th rep_format( ) syntax structure in the active VPS.

The value of poc_lsb_not_present_flag[i] shall be equal to 1.

For any picture picA that has nuh_layer_id equal to layer_id_in_nuh[i] and refers to the VPS, the following applies:

When slice_pic_order_cnt_lsb is greater than 0, poc_reset_idc shall not be equal to 2.

When full_poc_reset_flag is equal to 1, poc_lsb_val shall be equal to 0.

It should be understood that the syntax included herein is merely for purposes of example. That is, while the example above is described with respect to that base_layer_compatibility flag, video encoder 20 and video decoder 30 may apply the constraints described herein with respect to another, different syntax element or in another manner.

In a third example, a constraint is added to the semantics of poc_lsb_not_present_flag[i] such that when there is at least one access unit that contains a non-IDR picture with nuh_layer_id equal to 0 and an IDR picture with nuh_layer_id equal to layer_id_in_nuh[i], poc_lsb_not_present_flag[i] shall not be equal to 1. A condition is added to the signaling of the syntax element base_layer_parameter_set_compatibility_flag[i] such that the syntax element is present only when the value of poc_lsb_not_present_flag[i] is equal to 1. The value for base_layer_parameter_set_compatibility_flag[i] when it is not present is inferred to be equal to 0.

In addition, the signaling of the syntax element base_layer_parameter_set_compatibility_flag[i] with the above-noted change may be modified as set forth in the table below:

| vps_vui( ) { | Descriptor |
|---|---|
| ... | |
| for( i = 1; i <= MaxLayersMinus1; i++ ) | |
| if( !poc_lsb_not_present_flag[ i ]) | |
| base_layer_parameter_set_compatibility_flag[ i ] | u(1) |
| ... | |
| } | |

In the table above, a poc_lsb_not_present_flag[i] equal to 1 specifies that the slice_pic_order_cnt_lsb syntax element is not present in the slice headers of IDR pictures with nuh_layer_id equal to layer_id_in_nuh[i] in the CVS. In addition, poc_lsb_not_present_flag[i] equal to 0 specifies that slice_pic_order_cnt_lsb syntax element may or may not be present in the slice headers of IDR pictures with nuh_layer_id equal to layer_id_in_nuh[i] in the CVS. When not present, the value of poc_lsb_not_present_flag[i] is inferred to be equal to 0.

In addition, a base_layer_parameter_set_compatibility_flag[i] equal to 1 specifies that the following constraints apply to the layer with nuh_layer_id equal to layer_id_in_nuh[i]. A base_layer_parameter_set_compatibility_flag[i] equal to 0 specifies that the following constraints may or may not apply to the layer with nuh_layer_id equal to layer_id_in_nuh[i]. In general, the base_layer_parameter_set_compatibility_flag[i] may indicate whether an enhancement layer uses the parameter sets (e.g., PPS and SPS) of the base layer.

In a fourth example, according to aspects of this disclosure, video encoder 20 and video decoder 30 may be configured to implement a new flag for each layer that indicates whether an independent layer may be extracted and decoded by an HEVC compliant decoder without having to update information in the slice headers of pictures in the layer. The signaling associated with such a flag may be as set forth in Table I below:

TABLE 1

| vps_vui( ) { | Descriptor |
|---|---|
| ... | |
| for( i = 1; i <= MaxLayersMinus1; i++ ) | |
| if( NumDirectRefLayers + layer_id_in_nuh[ i ] ] = = 0) | |
| slice_segment_header_update_not_required_for_extraction_flag[ i ] | u(1) |
| ... | |
| } | |

In the example of Table I above, slice_segment_header_update_not_required_for_extraction_flag[i] equal to 1 specifies that the slice segment headers of pictures with nuh_layer_id equal to layer_id_in_nuh[i] in each CVS referring to the VPS does not need to be updated when the sub-bitstream extraction process is invoked with the layer with nuh_layer_id equal to layer_id_in_nuh[i] being the lowest layer in the input TargetDecLayerIdList. In addition, slice_segment_header_update_not_required_for_extraction_flag[i] equal to 0 specifies that the slice headers of pictures with nuh_layer_id equal to layer_id_in_nuh[i] in the CVS may or may not need to be updated when the sub-bitstream extraction process is invoked with the layer with nuh_layer_id equal to layer_id_in_nuh[i] being the lowest layer in the input TargetDecLayerIdList. When not present, slice_segment_header_update_not_required_for_extraction_flag[i] is inferred to be equal to 0.

Figure 5:
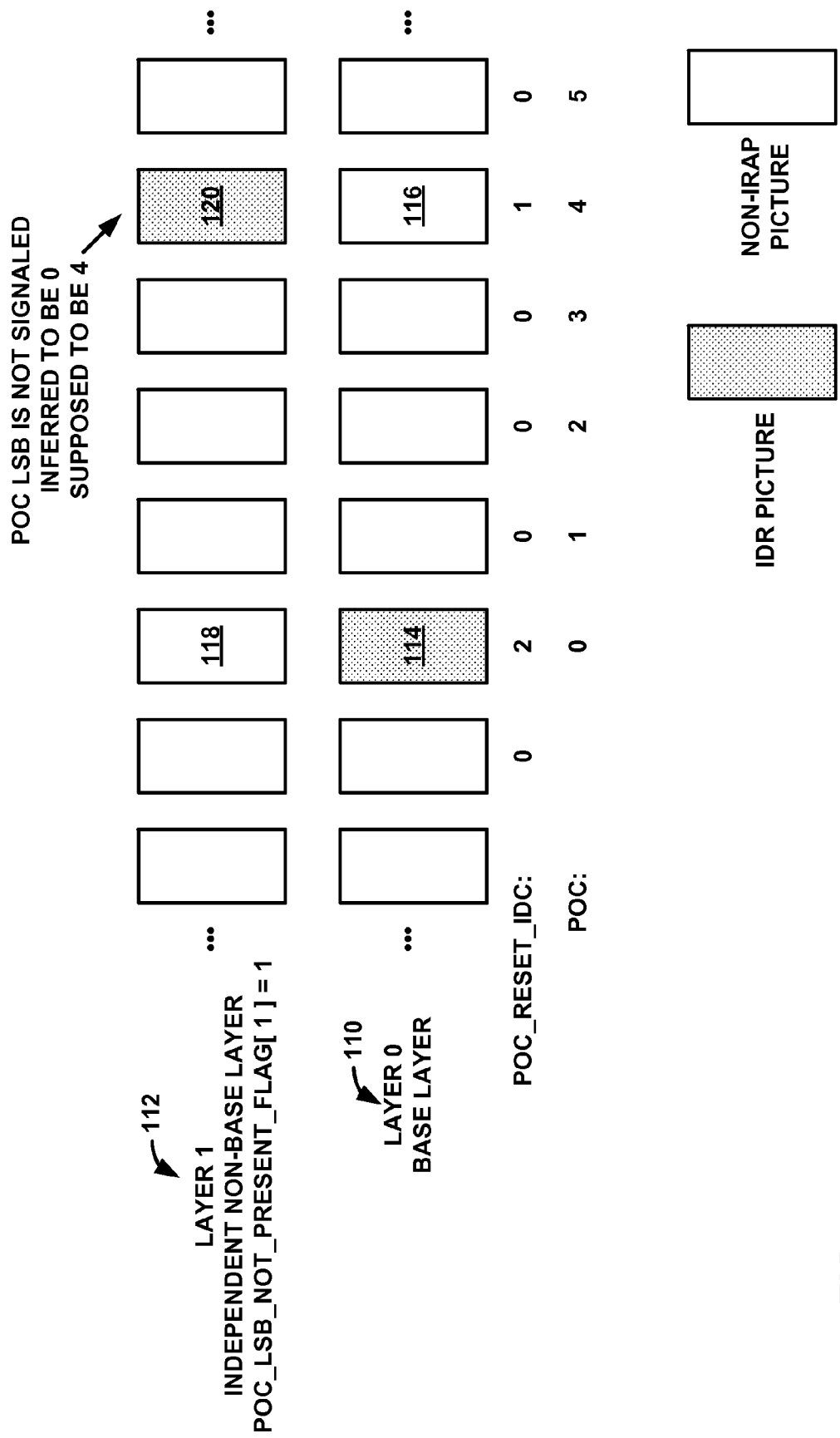
FIG. 5 is another conceptual diagram illustrating POC value resetting for an independent non-base layer of a multi-layer bitstream.

FIG. 5 is another conceptual diagram illustrating POC value resetting for an independent non-base layer of a multi-layer bitstream. In the example of FIG. 5, the multi-layer bitstream includes a base layer (LAYER 0) 110 and independent non-base layer (LAYER 1) 112. Base layer 110 includes IDR picture 114 and picture 116. Non-base layer 112 includes picture 118 that is in the same access unit as picture 114 of base layer 110 and IDR picture 120 that is in the same access unit as picture 116 of base layer 110.

A video decoder, such as video decoder 30, may be configured to decode base layer 110 and non-base layer 112 using a particular video coding standard, e.g., MV-HEVC or SHVC. Video decoder 30 may be configured to perform POC value resetting for picture 114 of base layer 110, because picture 114 is an IDR picture. Video decoder may decode a POC value reset index (poc_reset_idc) that is equal to 2 for picture 114. In addition, in order to maintain cross-layer alignment of POC values, video decoder 30 may also perform POC value resetting of picture 118 included in non-base layer 112. Accordingly, after POC value resetting, both picture 114 of base layer 110 and picture 118 of non-base layer 112 have a POC LSB value equal to zero.

The syntax element poc_lsb_not_present_flag[i], as included in MV-HEVC and SHVC, allows POC LSB information to not be included in slice segment headers of slices that belong to an IDR picture of an independent enhancement layer, such as non-base layer 112. The syntax element may aid in allowing non-base layer 112 to be extracted from a multi-layer bitstream and decoded by an HEVC decoder (e.g., rather than a decoder configured for MV-HEVC or SHVC) without modifying slice segment headers of the pictures in the layer and by only changing the nuh_layer_id_in the NAL unit headers. For example, as currently set forth in the working drafts of MV-HEVC and SHVC, the poc_lsb_not_present_flag equal to one specifies that the POC LSB value is not present in the slice headers of IDR pictures. The poc_lsb_not_present_flag equal to zero specifies that the POC LSB value may or may not be present in the slice headers of IDR pictures.

The only explicit restriction on the poc_lsb_not_present_flag[i] included in the above-noted MV-HEVC and SHVC standards is that the value of poc_lsb_not_present_flag[i] may be set to 1 for a non-base layer only when the layer is independent (e.g., inter-layer prediction is not used to predict video data of the layer). Indicating that the POC LSB value is not included in the slice header of an independent non-base layer such as non-base layer 112, however, may create an issue for pictures that do not have a POC LSB value of zero.

For example, as shown in the example of FIG. 5, non-base layer 112 may be associated with a poc_lsb_not_present_flag[i] that is set equal to 1, such that a POC LSB value may not be included in slice headers of IDR pictures to maintain conformance with an HEVC decoder. Picture 120 is an IDR picture for which POC value resetting is performed (e.g., poc_reset_idc is equal to 1). Accordingly, the slice headers of slices of picture 120 may not include an indication of the POC LSB value. Video decoder 30 may infer (e.g., automatically determine) that the POC LSB value of picture 120 is equal to zero.

Inferring that the POC LSB value of picture 120 is equal to zero, however, may cause the multi-layer bitstream to be non-conformant to the HEVC standard, because the POC LSB value of picture 116 of base layer 110 (which is in the same access unit as picture 120 of non-base layer 112) is not equal to zero. Rather, the POC LSB value of picture 116 of base layer 110 is 4. Accordingly, the access unit containing pictures 116 and 120 includes pictures having different POC values, which is not permitted for bitstream conformance.

According to aspects of this disclosure, video encoder 20 and video decoder 30 may code data indicating a POC value reset for a POC LSB value of a picture only when the picture has a POC LSB value for the picture is equal to zero. For example, video encoder 20 and video decoder 30 apply a constraint such that the value of poc_lsb_not_present_flag[i] is not equal to one (e.g., indicating that the POC LSB value is not included in the slice header) unless the POC LSB value of an IDR picture in the layer may be inferred to be equal to zero. The POC LSB value of an independent non-base layer picture may be inferred to be equal to zero when the POC LSB value of the base layer picture of the same access unit is an IDR picture, or the POC LSB value of the non-base layer picture is zero valued (e.g., rolls over to be equal zero following a normal progression of POC LSB values).

In the example of FIG. 5, according to aspects of this disclosure, video encoder 20 and video decoder 30 may not code a poc_lsb_not_present_flag [i] that is equal to 1 for non-base layer 112, because the POC LSB value of picture 120, which is an IDR picture, cannot be inferred to be equal to zero. To the contrary, the POC LSB value of picture 120 is 4. A poc_sb_not_present_flag that is equal to 0 may indicate that non-base layer 112 is not able to be independently decoded, e.g., using an HEVC compliant video decoder, without modifying one or more syntax elements such as syntax elements included in a slice header of picture 120.

In this manner, according to aspects of this disclosure, the value of poc_lsb_not_present_flag[i] may be constrained such that it shall not be equal to 1 when the multi-layer bitstream contains one or more access units that have a base layer picture that is a non-IDR picture with a non-zero POC LSB value and an enhancement layer picture (corresponding to the i-th layer in the VPS) that is an IDR picture. In an example, the following constraint be added as part of the semantics of poc_lsb_not_present_flag[i] of MV-HEVC and SHVC (e.g., as a note to the semantic of poc_lsb_not_present_flag[i]), where additions are represented using italics:

It is a requirement of bitstream conformance that, within all CVSs that refer to the VPS, when there is at least one access unit that contains a non-IDR picture with nuh_layer_id equal to 0 and slice_pic_order_cnt_lsb greater than 0, and that contains an IDR picture with nuh_layer_id equal to layer_id_in_nuh[i], poc_lsb_not_present_flag[i] shall not be equal to 1.

In another example, the following constraint be added as part of the semantics of poc_lsb_not_present_flag[i] of MV-HEVC and SHVC (e.g., as a note to the semantic of poc_lsb_not_present_flag[i]), where additions are represented using italics:

It is a requirement of bitstream conformance that, within all the CVSs referring to the VPS, when there is at least one access unit that contains a non-IDR picture with nuh_layer_id equal to 0 and an IDR picture with nuh_layer_id equal to layer_id_in_nuh[i], poc_lsb_not_present_flag[i] shall not be equal to 1.

In another example, the following constraint be added as part of the semantics of poc_lsb_not_present_flag[i] of MV-HEVC and SHVC (e.g., as a note to the semantic of poc_lsb_not_present_flag[i]), where additions are represented using italics:

It is a requirement of bitstream conformance that, when poc_lsh_not_present_flag[i] is equal to 1, within all CVSs that refer to the VPS, when an access unit contains an IDR picture with nuh_layer_id equal to layer_id_in_nuh[i], the value of slice_pic_order_cnt_lsb have to be equal to 0 for all pictures in the access unit unless poc_reset_idc is equal to 2 for all pictures in the access unit.

Figure 6:
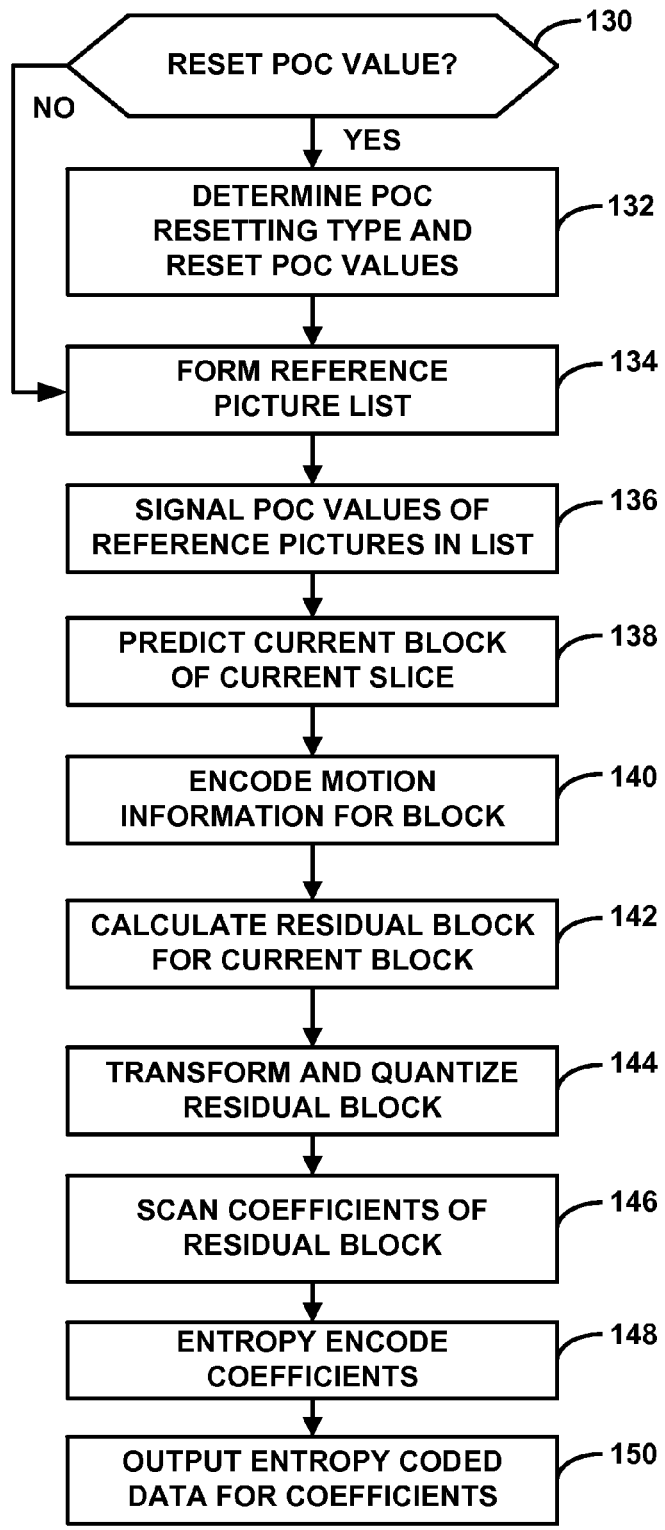
FIG. 6 flowchart illustrating an example method for encoding video data of a multi-layer bitstream in accordance with the techniques of this disclosure.

FIG. 6 is a flowchart illustrating an example method for encoding video data of a multi-layer bitstream in accordance with the techniques of this disclosure. In addition, the method of FIG. 6 includes encoding a current block. The current block may comprise a current CU or a portion of the current CU. Although described with respect to video encoder 20 (FIGS. 1 and 2), it should be understood that other devices may be configured to perform a method similar to that of FIG. 6.

In this example, video encoder 20 may determine whether to reset a POC value for the picture that includes the current block (130). When POC value resetting is performed, video encoder 20 may determine a POC resetting type and reset the POC value of the picture (132). According to aspects of this disclosure, video encoder 20 may only encode data indicating a POC value reset for a POC LSB value of the picture when the picture has a POC LSB value for the picture is equal to zero.

For example, as described above with respect to FIG. 2, video encoder 20 may encode a poc_reset_idc syntax element. According to aspects of this disclosure, video encoder 20 may control the manner in which the poc_reset_idc value is encoded based on one or more constraints. For example, video encoder 20 may encode the poc_reset_idc syntax element to be equal to 2 only when the picture being coded has a POC LSB value equal to zero. That is, when a poc_lsb_not_present_flag for a particular layer being coded is equal to 1 (e.g., indicating that the layer is an independent non-base layer) and a slice_pic_order_cnt_lsb syntax element indicating the POC LSB value of the picture is greater than 0, video encoder 20 may not set the value of poc_reset_idc to be equal to 2.

When video encoder 20 encodes the poc_reset_idc syntax element to be equal to 3, video encoder 20 may further encode a full_poc_reset_flag and a poc_lsb_val syntax element. According to aspects of this disclosure, when a poc_lsb_not_present_flag (which may indicate that the layer being encoded is an independent non-base layer) for the layer being encoded is equal to 1 and full_poc_reset_flag is equal to 1, video encoder 20 may set the value of poc_lsb_val equal to 0. In this manner, video encoder 20 may ensure POC value resetting is only performed for pictures having a POC LSB value equal to zero, which may allow reference pictures to be properly identified, as described herein.

Video encoder 20 may then form a reference picture list (134). Video encoder 20 further signals POC values of the reference pictures included in the reference picture list (136). For example, video encoder 20 may encode POC values (or portions of the POC values, e.g., POC LSB values) for the reference pictures in a parameter set such as an SPS or PPS, and/or in a slice header for the slice. Some reference pictures (e.g., long-term reference pictures) may be signaled in the parameter set, whereas other reference pictures (e.g., short-term reference pictures) may be signaled in the slice header.

It should be understood that the steps of forming the reference picture list and signaling which pictures are included in the reference picture list may be performed multiple times over several different encoding passes, in order to determine the set of reference pictures that yields the best rate-distortion characteristics for, e.g., blocks of the current slice. That is, video encoder 20 may select the set of reference pictures included in the reference picture list based on characteristics of all blocks in the current slice, and not just based on the individual characteristics of a single block.

Video encoder 20 may then predict the current block of the current slice (138). For example, video encoder 20 may calculate one or more prediction units (PUs) for the current block. More particularly, motion estimation unit 42 may perform a motion search for the current block among the reference pictures of the reference picture list to identify a matching block used as a reference block, e.g., based on SAD, SSD, MAD, MSD, or other error calculation metrics. Motion estimation unit 42 may produce a motion vector for the current block based on the motion search Video encoder 20 may then encode motion information for the block (140), which may include motion vector difference values for the motion vector, a reference picture list identifier, and a reference index, which together identify the reference block.

Video encoder 20 may then calculate a residual block for the current block. e.g., to produce a transform unit (TU) (142). To calculate the residual block, video encoder 20 may calculate a difference between the original, uncoded block and the predicted block for the current block. Video encoder 20 may then transform and quantize coefficients of the residual block (144). Next, video encoder 20 may scan the quantized transform coefficients of the residual block (146). During the scan, or following the scan, video encoder 20 may entropy encode the coefficients (148). For example, video encoder 20 may encode the coefficients using CAVLC or CABAC. Video encoder 20 may then output the entropy coded data of the block (150).

In this manner, the method of FIG. 6 represents an example of a method including encoding, by a video encoder, at least a portion of a picture of an independently decodable layer of a multi-layer bitstream, and encoding, by the video coder, data indicating a picture order count (POC) value reset for a POC least significant bits (LSB) value of the picture only when the picture has a POC LSB value for the picture is equal to zero.

Figure 7:
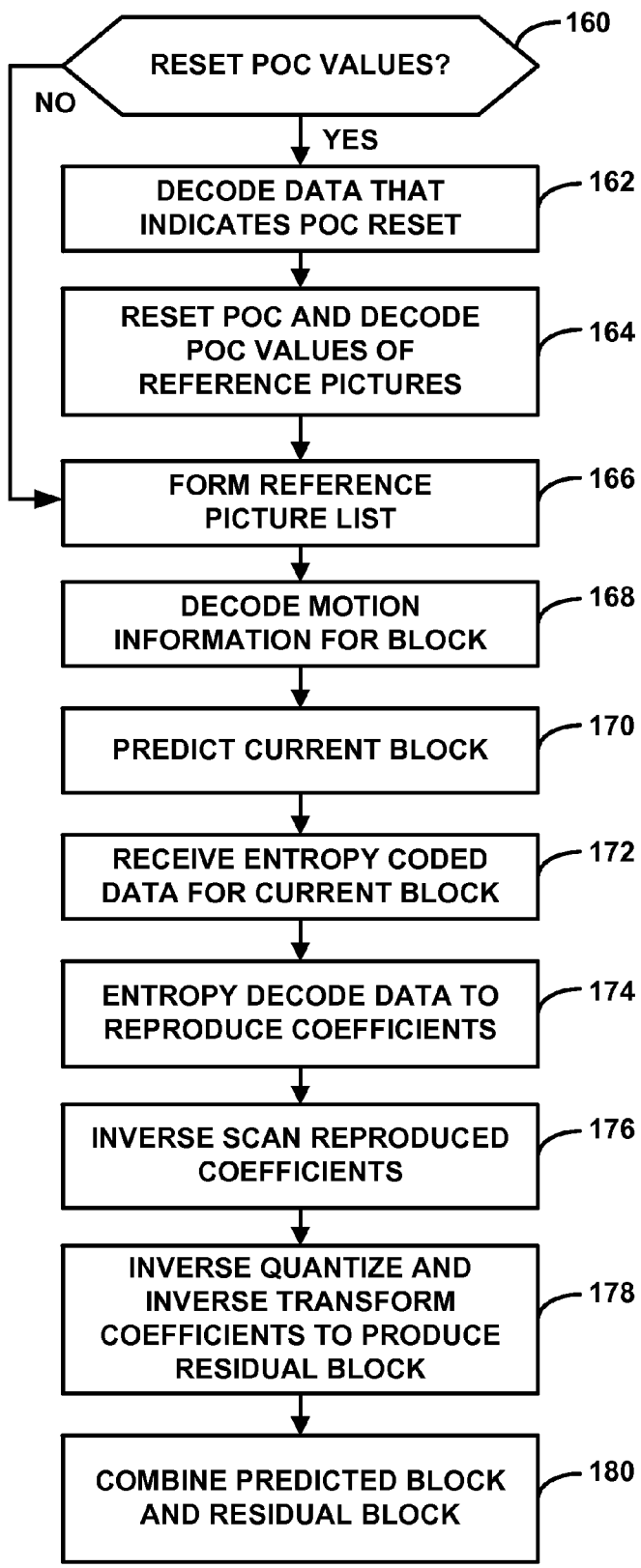
FIG. 7 is a flowchart illustrating an example method for decoding video data of a multi-layer bitstream in accordance with the techniques of this disclosure.

FIG. 7 is a flowchart illustrating an example method for decoding video data of a multi-layer bitstream in accordance with the techniques of this disclosure. In addition, the method of FIG. 7 includes decoding a current block. The current block may comprise a current CU or a portion of the current CU. Although described with respect to video decoder 30 (FIGS. 1 and 3), it should be understood that other devices may be configured to perform a method similar to that of FIG. 7.

In this example, video decoder 30 may determine whether to reset a POC value for the picture that includes the current block (160). When POC value resetting is performed, video decoder 30 may decode data that indicates the POC resetting (162). In some instances, video decoder 30 may decode data that indicates a POC resetting type. According to aspects of this disclosure, video decoder 30 may only encode data indicating a POC value reset for a POC LSB value of the picture when the picture has a POC LSB value for the picture is equal to zero.

For example, as described above with respect to FIG. 3, video decoder 30 may decode a poc_reset_idc syntax element. According to aspects of this disclosure, video decoder 30 may receive and decode a poc_reset_idc based on one or more constraints. For example, video decoder 30 may decode a poc_reset_idc syntax element having a value of 2 only when the picture being coded has a POC LSB value equal to zero. That is, when a poc_lsb_not_present_flag for a particular layer being coded is equal to 1 (e.g., indicating that the layer is an independent non-base layer) and a slice_pic_order_cnt_lsb syntax element indicating the POC LSB value of the picture is greater than 0, video decoder 30 may not decode a value of poc_reset_idc that is equal to 2.

When video decoder 30 decodes a poc_reset_idc syntax element that is equal to 3, video decoder 30 may further decode a full_poc_reset_flag and a poc_lsb_val syntax element. According to aspects of this disclosure, when a poc_lsb_not_present_flag (which may indicate that the layer being encoded is an independent non-base layer) for the layer being encoded is equal to 1 and full_poc_reset_flag is equal to 1, video decoder 30 may decode a value of poc_lsb_val that is equal to 0. In this manner, video decoder 30 may ensure POC value resetting is only performed for pictures having a POC LSB value equal to zero, which may allow reference pictures to be properly identified, as described herein.

Video decoder 30 then resets the POC value of the picture and decodes POC values of reference pictures (164), e.g., from the slice segment header and/or a parameter set such as a PPS or SPS. Video decoder 30 then forms the reference picture list (166).

Next, video decoder 30 decodes motion information for a current block (168). The motion information may include, for example, a reference picture list identifier and a reference index into the reference picture list. Video decoder 30 then predicts the current block (170), e.g., using inter-prediction mode to calculate a predicted block for the current block. More particularly, video decoder 30 uses the reference picture list identifier to identify which reference picture list to use, and the reference index to identify a reference index in the reference picture list. Video decoder 30 then decodes a motion vector for the current block and identifies a reference block in the identified reference picture.

Video decoder 30 may also receive entropy coded data for the current block, such as entropy coded data for coefficients of a residual block corresponding to the current block (172). Video decoder 30 may entropy decode the entropy coded data to reproduce coefficients of the residual block (174). Video decoder 30 may then inverse scan the reproduced coefficients (176), to create a block of quantized transform coefficients. That is, using the inverse scan, video decoder 30 converts a one-dimensional vector to a two-dimensional matrix. Video decoder 30 may then inverse quantize and inverse transform the coefficients to produce a residual block (178). Video decoder 30 may ultimately decode the current block by combining the predicted block and the residual block (180).

In this manner, the method of FIG. 7 represents an example of a method including decoding, by a video decoder, at least a portion of a picture of an independently decodable layer of a multi-layer bitstream, and decoding, by the video decoder, data indicating a picture order count (POC) value reset for a POC least significant bits (LSB) value of the picture only when the picture has a POC LSB value for the picture is equal to zero.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
    coding, in a slice header of a slice segment of a current picture, a first syntax element, the first syntax element indicating Least Significant Bits (LSBs) of a Picture Order Count (POC) of the current picture, the current picture being in an independently decodable non-base layer of a multi-layer bitstream; and
    coding, in the slice header of the slice segment of the current picture, a POC value reset index, wherein the POC value reset index equal to 2 indicates a reset of both most significant bits (MSBs) of the POC of the current picture and the LSBs of the POC of the current picture, wherein a constraint provides that based on the first syntax element being greater than 0, the POC value reset index shall not be equal to 2.

2. The method of claim 1, further comprising determining that the POC LSB value of the current picture is equal to zero based on a picture type of the current picture, wherein the picture type is one of an instantaneous decoder refresh (IDR) picture, a broken link access (BLA) picture, or a clean random access (CRA) picture.

3. The method of claim 1, wherein based on the LSBs of the POC of the current picture being equal to zero, coding the POC value reset index comprises coding a poc_reset_idc syntax element that is equal to 3.

4. The method of claim 1, further comprising coding the first syntax element to indicate that the LSBs of the POC value of the current picture is equal to zero.

5. The method of claim 1, further comprising coding one or more syntax elements indicating that the independently decodable non-base layer is an independently decodable layer.

6. The method of claim 1, wherein the multi-layer bitstream conforms to one of a Multi-view Video Coding extension to HEVC (MV-HEVC) video coding standard or a Scalable Video Coding extension to HEVC (SHVC) video coding standard, and wherein the independently decodable non-base layer conforms to the HEVC video coding standard.

7. The method of claim 6, further comprising coding one or more other pictures of the independently decodable non-base layer using the HEVC video coding standard and without altering data of slice headers of the one or more other pictures.

8. The method of claim 6, wherein the multi-layer bitstream conforms to the SHVC video coding standard, and wherein the independently decodable non-base layer has a higher resolution than a base layer of the multi-layer bitstream.

9. The method of claim 6, wherein the multi-layer bitstream conforms to the MV-HEVC video coding standard, and wherein the independently decodable non-base layer comprises a different view than a view of a base layer of the multi-layer bitstream.

10. The method of claim 1, wherein coding comprises encoding, and the method further comprises:
generating residual data indicating a difference between predictive data and a block of the current picture;
applying a transform to the residual data the generate transform coefficients; and
generating a bitstream that includes an indication of the transform coefficients.

11. The method of claim 1, wherein coding comprises decoding, and the method further comprises:
obtaining transform coefficients for the at least a portion from an encoded bitstream;
applying an inverse transform to the transform coefficients to generate residual data; and
determining a block of the current picture based on the generated residual data.

12. A device for coding video data, the device comprising:
a memory configured to store an independently decodable non-base layer of video data of a multi-layer bitstream; and
a video coder configured to:
code, in a slice header of a slice segment of a current picture, a first syntax element, the first syntax element indicating Least Significant Bits (LSBs) of a Picture Order Count (POC) of the current picture, the current picture being in the independently decodable non-base layer of the multi-layer bitstream; and
code, in the slice header of the slice segment of the current picture, a POC value reset index, wherein the POC value reset index equal to 2 indicates a reset of both most significant bits (MSBs) of the POC of the current picture and the LSBs of the POC of the current picture, wherein a constraint provides that based on the first syntax element being greater than 0, the POC value reset index shall not be equal to 2.

13. The device of claim 12, wherein the video coder is further configured to determine that the POC LSB value of the current picture is equal to zero based on a picture type of the current picture, wherein the picture type is one of an instantaneous decoder refresh (IDR) picture, a broken link access (BLA) picture, or a clean random access (CRA) picture.

14. The device of claim 12, wherein the video coder is configured to code, based on the LSBs of the POC of the current picture being equal to zero, a poc_reset_idc syntax element for the POC value reset index that is equal to 3.

15. The device of claim 12, wherein the video coder is further configured to code the first syntax element to indicate that the LSBs of the POC value of the current picture is equal to zero.

16. The device of claim 12, wherein the video coder is further configured to code one or more syntax elements indicating that the independently decodable non-base layer is an independently decodable layer.

17. The device of claim 12, wherein the multi-layer bitstream conforms to one of a Multi-view Video Coding extension to HEVC (MV-HEVC) video coding standard or a Scalable Video Coding extension to HEVC (SHVC) video coding standard, and wherein the independently decodable non-base layer conforms to the HEVC video coding standard.

18. The device of claim 17, wherein the video coder is further configured to code one or more other pictures of the independently decodable non-base layer using the HEVC video coding standard and without altering data of slice headers of the one or more other pictures.

19. The device of claim 17, wherein the multi-layer bitstream conforms to the SHVC video coding standard, and wherein the independently decodable non-base layer has a higher resolution than a base layer of the multi-layer bitstream.

20. The device of claim 17, wherein the multi-layer bitstream conforms to the MV-HEVC video coding standard, and wherein the independently decodable non-base layer comprises a different view than a view of a base layer of the multi-layer bitstream.

21. The device of claim 12, wherein the video coder comprises a video encoder, and wherein the video encoder is further configured to:
calculate residual data indicating a difference between predictive data and a block of the current picture;
apply a transform to the residual data the generate transform coefficients; and
generate a bitstream that includes an indication of the transform coefficients.

22. The device of claim 12, wherein the video coder comprises a video decoder, and wherein the video decoder is further configured to:
obtain transform coefficients for the at least a portion from an encoded bitstream;
apply an inverse transform to the transform coefficients to generate residual data; and determine a block of the current picture based on the generated residual data.

23. The device of claim 12, wherein the device comprises at least one of:
   an integrated circuit;
   a microprocessor; or
   a wireless communication device.

24. A device for coding video data, the device comprising:
   means for coding, in a slice header of a slice segment of a current picture, a first syntax element, the first syntax element indicating Least Significant Bits (LSBs) of a Picture Order Count (POC) of the current picture, the current picture being in an independently decodable non-base layer of a multi-layer bitstream; and
   means for coding, in the slice header of the slice segment of the current picture, a POC value reset index, wherein the POC value reset index equal to 2 indicates a reset of both most significant bits (MSBs) of the POC of the current picture and the LSBs of the POC of the current picture,
   wherein a constraint provides that based on the first syntax element being greater than 0, the POC value reset index shall not be equal to 2.

25. A non-transitory computer-readable storage medium having stored thereon instructions that, when executed, cause a processor of a device for coding video data to:
   code, in a slice header of a slice segment of a current picture, a first syntax element, the first syntax element indicating Least Significant Bits (LSBs) of a Picture Order Count (POC) of the current picture, the current picture being in an independently decodable non-base layer of a multi-layer bitstream; and
   code, in the slice header of the slice segment of the current picture, a POC value reset index, wherein the POC value reset index equal to 2 indicates a reset of both most significant bits (MSBs) of the POC of the current picture and the LSBs of the POC of the current picture,
   wherein a constraint provides that based on the first syntax element being greater than 0, the POC value reset index shall not be equal to 2.

* * * * *